(12) United States Patent
Ohnuma et al.

(10) Patent No.: US 6,383,729 B1
(45) Date of Patent: May 7, 2002

(54) PHOTOGRAPHIC SUPPORT AND PHOTOTHERMOGRAPHIC MATERIAL BY USE THEREOF

(75) Inventors: Kenji Ohnuma; Hidetoshi Ezure; Yuji Hosoi, all of Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/687,341

(22) Filed: Oct. 13, 2000

(30) Foreign Application Priority Data

Oct. 21, 1999 (JP) .......................................... 11-299153

(51) Int. Cl.[7] .................. G03C 1/795; G03C 11/22; B32B 27/06; B32B 27/36
(52) U.S. Cl. .................. 430/533; 430/349; 430/619; 430/939; 428/480; 264/177.19; 264/210.7; 264/290.2
(58) Field of Search .................. 430/349, 533, 430/939; 428/480; 264/177.19, 210.7, 290.2

(56) References Cited

U.S. PATENT DOCUMENTS

| | | | | |
|---|---|---|---|---|
| 6,060,226 A | * | 5/2000 | Hashimoto | 430/349 |
| 6,124,042 A | * | 9/2000 | Hashimoto | 430/533 |
| 6,235,458 B1 | * | 5/2001 | Hashimoto | 430/533 |
| 6,274,247 B1 | * | 8/2001 | Hashimoto et al. | 430/533 |

* cited by examiner

*Primary Examiner*—Richard L. Schilling
(74) *Attorney, Agent, or Firm*—Frishauf, Holtz, Goodman, Langer & Chick, P.C.

(57) ABSTRACT

A polyester film is disclosed, exhibiting a minimum value of not more than 0.15 with respect to the tan δ value obtained at a frequency of 0.01 Hz within the range of 100 to 160° C., the tan δ being determined in a tensile viscoelasticity measurement. A photographic support and photothermographic material using this polyester film are also disclosed, which exhibits superior dimensional stability even when subjected to thermal development at a high temperature and little roll set curl when used in a roll form.

24 Claims, 1 Drawing Sheet

PHOTOGRAPHIC SUPPORT AND PHOTOTHERMOGRAPHIC MATERIAL BY USE THEREOF

FIELD OF THE INVENTION

The present invention relates to supports for photographic use, a preparation method thereof and photothermographic materials by use thereof.

BACKGROUND OF THE INVENTION

In the field of graphic arts and medical diagnosis, waste liquor produced in wet-processing of image forming material results in problems and further reduction of processing effluent is strongly desired in terms of environmental protection and space saving. Accordingly, a technique for photothermographic materials is required which enables efficient exposure by means of a laser image setter or a laser imager and formation of black images exhibiting high resolution and clearness. As such a technique is known a thermally developable photothermographic material which comprises on a support an organic silver salt, light sensitive silver halide grains, reducing agent and a binder, as described in U.S. Pat. Nos. 3,152,904 and 3,487,075, and D. Morgan "Dry Silver Photographic Material", Handbook of Imaging Materials, Marcel Dekker, Inc. page 48 (1991). These photographic materials, which are developed at a temperature of 80° C. or higher, are called a thermally developable photothermographic material (hereinafter, also simply denoted as a photothermographic material).

Plural color-separation film sheets prepared from photographic material for graphic arts use are used to undergo color printing. Each of such color separation films is printed onto a printing plate and color printing is made by superposition thereof. When plural color separation films are superposed, if the superposition is not entirely identical, a phenomenon such as doubling occurs in printing. Accordingly, in photothermographic materials for use in plate-making, prevention of thermal dimensional change is one of important problems in photothermographic materials for use in plate-making.

Photographic materials for use in printing plate making are often used by taking out a necessary amount from the roll form, in terms of simplicity and space-saving. When using such a roll film, roll set curl produces a problem in operation. Thus, in cases when such roll set curl is marked, there are such problems that the film cannot be straightly cut with an automatic cutter, the thus cut film cannot be finely superposed and close contact with an original at the time of exposure is poor. Specifically, in the case of a thermal developing system, poor contact with a heat-developing roll results in serious troubles such as uneven development.

SUMMARY OF THE INVENTION

The present invention was proposed to overcome the foregoing problems. Thus, it is an object of the present invention to provide a photothermographic material for use in printing plate-making, specifically suitable for multiple plate printing, which exhibits superior dimensional stability even when subjected to thermal development at a high temperature and little roll set curl when used in a roll form, and a photographic support used in the photothermographic material, and a polyester film.

The above object of the invention can be accomplished by the following constitution:

1. a polyester film, wherein, when subjected to a tensile viscoelasticity measurement, the polyester film exhibits a minimum value of not more than 0.15 with respect to a tan δ value obtained at a frequency of 0.01 Hz within the temperature range of 100 to 160° C., the tan δ value being determined in a tensile viscoelasticity measurement;
2. a photographic support comprising a polyester film as described in 1. above;
3. a photothermographic material comprising a support having thereon an organic silver salt, a silver halide and a reducing agent, wherein the support comprises a polyester film as described in 1. above.

EMBODIMENTS OF THE INVENTION

Figure 1:
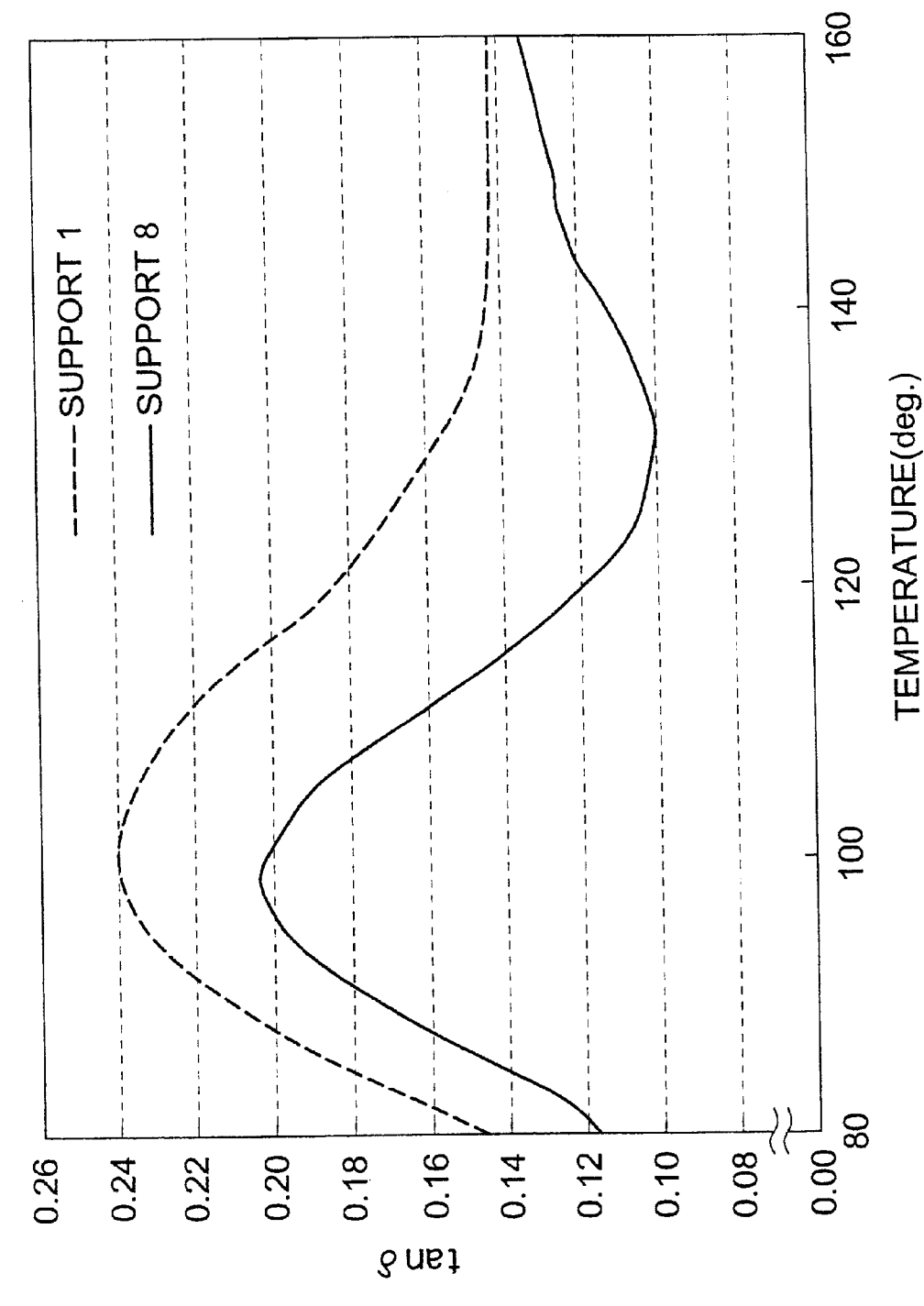
FIG. 1 shows variations in tan δ value with temperature.

The present invention will be further described in detail.
Support
Biaxially stretched polyester films preferably used for photographic support used in this invention include, for example, polyethylene phthalate (also denoted as PET), polyethylene naphthalate (PEN), polycarbonate (PC) and polyacrylate (PAr) Of these, a polyester comprised of PET or PEN is preferred. Herein, the expression, "comprised of" include not only a homopolymer but also a copolymers or a polymer blend, in which at least 50% by weight of the total constituting elements is accounted for by this polymer.

PET is comprised of terephthalic acid and ethylene glycol, which are bound with each other in the presence of a catalyst under the optimum conditions to form a polymer. In this case, at least an appropriate third component may be mixed in. The third component may be any divalent ester-forming functional group-containing compound, such as dicarboxylic acid compounds, including isophthalic acid, phthalic acid, 2,6-naphthalenedicarboxylic acid, 2,7-naphthalenedicarboxylic acid, diphenylsulfonedicarboxylic acid, diphenyletherdicarboxylic acid, diphenylethanedicarboxylic acid, cyclohexanedicarboxylic acid, diphenyldicarboxylic cid, diphenylthioetherdicarboxylic acid, diphenylketonedicarboxylic acid and phenylindanedicarboxylic acid. Examples of glycols include ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl) sulfones, bisphenolfluorenedihydroxyethylether, diethylene glycol, neopentylglycol, hydroquinone, and cyclohexanediol.

The intrinsic viscosity of PET is preferably 0.3 to 1.0, more preferably 0.4 to 0.8, and still more preferably 0.5 to 0.7. A mixture of plural polyesters exhibiting different intrinsic viscosities may be used. In this case, the difference in intrinsic viscosity is 0.1 to 0.4, and preferably 0.15 to 0.3.

The synthesis method of the PET used in this invention is not specifically limited and it can be synthesized according to any of the methods known in the art. Examples thereof include a direct esterification method in which a dicarboxylic acid component and a diol component are directly subjected to esterification and also a transesterification method in which a dialkyl ester, as a dicarboxylic acid component and a diol component are subjected to ester interchange to undergo polymerization, while removing the excess diol component. In this case, a transesterification catalyst or polymerization catalyst is optionally employed and a heat stabilizer may be used. Example of such a heat stabilizer include phosphoric acid, phosphorous acid and their ester compounds. Adjuvants such as an anti-coloring agent, nucleating agent, lubricant, stabilizer, anti-blocking agent, UV absorbent, viscosity-adjusting agent, defoaming agent, antistatic agent, pH-adjusting agent, dye, and pigment may be added at any step in the synthesis process.

Next, a preparation method of photographic supports will be described. A method for obtaining an unstretched sheet or film and a method of uniaxially stretching in the longitudinal direction can be accomplished according to techniques known in the art. For example, polyester as a raw material is molded into a pellet form, after drying with hot air or under vacuum, it is extruded into a sheet form by melt extrusion and a T-die, and brought into close contact with a cooling drum by the electrostatic applying method to be solidified. An unstretched sheet obtained is heated at a temperature within a range of the glass transition point of the polyester (Tg) and Tg+100° C. through plural roller groups and/or infrared heaters and subjected to longitudinal stretching. The stretching magnification is usually 2.5 to 6 times. In this case, roll-set curl can be lessened by allowing a stretching temperature to differ between inside and outside. For example, in heating at the stage of longitudinal stretching, a heating means such as an infrared ray heater is provided on one side to control temperature. This temperature difference at the stage of longitudinal stretching is preferably 0 to 40° C., and more preferably 0 to 20° C. A temperature difference of more than 40° C. results in non-uniform stretching, leading to deteriorated flatness of the film.

The thus longitudinally stretched polyester film is further laterally stretched at a temperature of Tg to Tg+120° C. and then fixed. The magnification ratio of longitudinal stretching to lateral stretching is optimally adjusted so as to exhibit preferred characteristics by measuring physical properties of the thus obtained biaxially stretched film. Then, the film is thermally fixed at a temperature higher than the final lateral-stretching temperature and lower than Tg+180° C. over a period of 0.5 to 300 sec. It is preferred to carry out thermal fixing at two or more different temperatures. The film thus fixed at two or more different temperatures exhibits enhanced dimensional stability and is highly effective as a support used for thermally processable photothermographic materials.

The support used in this invention is preferably subjected to a relaxation treatment in terms of dimensional stability. It is preferred that the relaxation treatment is conducted after completion of thermal fixing in the stretching process of the polyester film, within a tenter for lateral stretching, or at the stage of reeling after coming out of the tenter. The relaxation treatment is carried out preferably at a temperature of 80 to 200° C., more preferably 100 to 180° C., and still more preferably 120 to 160° C. A relaxation rate is preferably 0.1 to 10%, and more preferably 2 to 6% with respect to the longitudinal and lateral directions. The support which has been subjected to the relaxation treatment is further subjected to the thermal treatment used in this invention to obtain a photographic support exhibiting a preferred thermal dimensional change.

The thickness of the support used in this invention is not limited but the thicker is more preferred in terms of dimensional change rate. In cases where used as photographic materials for medical diagnostic use, the thickness is preferably 90 to 200 μm, and more preferably 150 to 190 μm. In the case of photographic materials for graphic arts use, four color printers are simultaneously printed so that higher transparency is desired. In view thereof, the thickness is preferably 70 to 180 μm, and more preferably 100 to 140 μm. With regard to haze in the support used in this invention, it is preferably not more than 3%, and more preferably not more than 1%. A haze of more than 3% makes images blurred when used in photographic materials for graphic arts use. The haze can be determined according to ASTM-D 1003-52.

Thermal Treatment

Thermal treatment used in this invention is a technique in which the support is subjected to thermal treatment at a temperature of not less than the glass transition temperature of the support and not more than the melting point of the support, while the support is transported under tension. Thus, the support is transported in a high-temperature atmosphere of the temperature range of from the glass transition temperature (also denoted as Tg) of the support to the melting point of the support under a tension of 0.01 to 30 kg/cm$^2$ (preferably 6.0 to 20 kg/cm$^2$, and more preferably 4.0 to 10 kg/cm$^2$).

Gradual Cooling of Polyester Film

The thermal treatment used in this invention is conducted to reduce roll-set curl and to enhance thermal dimensional stability, which is entirely different from a commonly known annealing treatment which is carried out at a temperature lower than the Tg of the support, in a roll form. Thus, the support is subjected to the thermal treatment at a temperature higher than the Tg, thereby reducing roll-set curl, while the support is transported under a tension, thereby enhancing thermal dimensional stability.

The thermal treatment time is preferably 0.5 to 60 min., and more preferably 10 to 20 min. The thermal treatment time can be controlled by changing the transport speed of the film or varying the length of the thermal treatment zone. In cases where the thermal treatment time is too short, roll-set curl of the support tends to increase. A thermal treatment of more than 60 min. results in deterioration in flatness or transparency of the support to unacceptable levels as a photographic support.

Herein, the thermal treatment zone refers to a transport apparatus comprising plural thermal treatment type ovens or plural heaters, which are different in temperature and arranged along the transport direction. Thus, the temperature at the transport inlet is the highest and temperatures of them are set along the transport direction so that the temperature of the latter is equal to or lower than that of the former. The temperature of the thermal treatment zone is so set that the inlet exhibits a temperature of from the Tg to the melting point and the outlet exhibits a temperature lower than that of the inlet. The temperature at the inlet is preferably Tg+10° C. to Tg+100° C. and the temperature at the outlet is preferably Tg to Tg+10° C. So far as the temperature at the inlet and outlet is within the foregoing range, the temperature is not specifically limited.

Transport Tension

The transport tension applied at the stage of the thermal treatment is desirably as low as possible to enhance the desired effects due to the thermal treatment of the support, that is, reducing the dimensional change after thermal processing (heat-development). However, too small a transport tension results in deteriorated flatness of the support, caused by different thermal shrinkage of various locations as well as fine abrasion marks produced by friction with the transport roll. In this invention, the transport tension is defined as a force applied to a support divided by a sectional area (i.e., width×thickness) of the support. The tension during the thermal treatment may be varied in a vibration manner, stepwise, or continuously. The tension is preferably varied stepwise, or continuously, and more preferably continuously varied. Thus, it is preferred that the thermal treatment temperature is gradually decreased and the transport tension is gradually increased.

Adjustment of the transport tension during the thermal treatment can be readily achieved by adjusting the torque of the reel roll and/or the delivery roll. Alternatively, a dancer roller is provided in the process and the tension can be adjusted by adjusting the load applied to the roller. In cases when varying the tension during the thermal treatment and/or during the cooling stage after the thermal treatment, a dancer roller is provided before and behind and/or within these processes and the intended tension can be obtained by adjusting the load applied to the roller.

Methods of the thermal treatment used in this invention, in which the photothermographic material is thermally treated on the way of transport, is not specifically limited. For example, a film is allowed to be continuously transported using a transport technique in which a film is transported with holding both ends of the film with a pin or clip, a roll transport technique by employing plural rolls or an air transport technique by blowing air to a film to float the film; and one side or both sides of the film are subjected to thermal treatment by blowing hot air ejected from plural slits to the film surface, by employing radiant heat by use of a infrared ray heater, or by bringing it into contact with plural heated rolls.

It must be kept in mind that when the thus thermally treated film is further heated at a temperature not less than 100° C. for a period of at least 30 sec., effects of this invention are reduced. The thermal treatment used in this invention is preferably conducted at any time after coating a sublayer and drying it, and before coating photographic component layers (photographic constituting layers, except for a sublayer). Exemplarily, after coating and drying a sublayer, the film may be continuously subjected to the thermal treatment, while being horizontally held; or after taken up in a roll, the film may be transported again by installing a transport equipment and heating equipment. Further, after coating and drying various functional layers such as a backing layer, a conductive layer, a lubrication layer and a magnetic layer (except for a photographic component layer and sublayer), the foregoing treatment may be conducted.

The thus thermally treated film is cooled from a temperature near the Tg to ordinary temperature and reeled up. To maintain flatness of the cooled film, the film is preferably cooled down to ordinary temperature at a rate of at least $-5°$ C. per sec. The thermally treated film is thus cooled to ordinary temperature, reeled up and stored until being sent to the subsequent process. To make roll-set curl after storage as low as possible, it is preferred to reel the film on a core having a large outer diameter, preferably of not less than 200 mm, more preferably not less than 300 mm, and still more preferably not less than 400 mm.

Curl

A photographic support which has been subjected to the foregoing thermal treatment exhibits less roll-set curling after being stored in a roll form. After a support of 20 cm in length and 30 mm in width is wound around a core of a diameter of 3 inches and aged at 55° C. and 20% RH over a period of 4 hrs., the support released from the core preferably exhibits a rise curl of not more than 20 mm, and more preferably not more than 10 mm. The condition of 55° C. and 20% RH for 4 hrs. is said to correspond to a validity term of the photosensitive layer under the conditions of storing conventional photographic materials. The rise curl is a rising height of four corners of the support sample when the convexly curling face is placed downward. A rise curl of more than 20 mm results in a large curling, leading to inconvenience in handling of photothermographic materials, development unevenness and transport troubles in a thermal processor as well as troubles in coating or thermal treatment under a low extension.

The photothermographic material used in this invention is preferably subjected to a treatment for gradually cooling the photothermographic material. Thus, it is preferred to provide a cooling section after a heat-developing section of the thermal processor so that the difference in surface temperature of the photothermographic material between at the inlet and outlet of the cooling section is at least 40° C. Examples of the cooling method include a method in which a film support is transported from the inlet toward the outlet by means of plural temperature-controlled rolls or belts and installation of fans to cool the film and the apparatus. Any means resulting in a surface temperature difference between at the inlet and outlet of at least 40° C. is applicable. In the case of a surface temperature difference being less than 40° C., a photothermographic material film taken out after development still exhibits a high temperature, leading to inconvenience in handling, and it is also softened and easily deformed, resulting in unfavorable curling such as a crease or crook. Accordingly, it is preferred to sufficiently cool it down before taking out of the processor.

Determination of tan δ

When a support used in the photothermographic materials used in this invention is subjected to measurement of tensile viscoelesticity, the tan δ value obtained at a frequency of 0.01 Hz exhibits a minimum value of not more than 0.15 within the temperature range of 100 to 160° C. In cases where this tan δ value exceeds 0.15, dimensional stability in heat-development falls outside the acceptable level in practical use. Specifically in the photothermographic materials which are usually heat-developed at temperature near 120° C., the minimum value of the tan δ value preferably is within the range of 120 to 140° C. in terms of dimensional stability at the heat-developing temperature.

The tan δ value meeting the foregoing requirement can be achieved by lowering thermal motion of a polymer chain constituting the support at temperatures near the heat-developing temperature. Exemplarily, it can be made by blending a resin having a component exhibiting rigidity at the vicinity of the temperature, by subjecting in advance to a thermal treatment (i.e., annealing) to enhance orientation of molecular chains, or by subjecting it to a relaxation treatment or a thermal treatment with transporting under a low tension to cause thermal shrinkage. However, any method may be applicable as far as it allows the tan δ value to meet the foregoing requirements.

Herein, the quantity tan δ is called the "loss tangent" or "damping". It is a measure of the energy loss and the ratio of loss modulus (E") to storage modulus (E'), as defined below:

$$\tan \delta E''/E'$$

The loss modulus is the ratio of out-of phase stress to strain, which is related to the amount of energy dissipated as heat; the storage modulus is the ratio of in-phase stress to strain, which is related to the amount of energy dissipated as heat.

Thermally developable photothermographic materials are disclosed in, for example, in U.S. Pat. Nos. 3,152,904 and 3,457,075; and D. Morgan "Dry Silver Photographic Material", Handbok of Imaging Materials, Marcel Dekker, Inc. page 48 (1991) and in D. H. Klosterboer "Thermally Processed Silver Systems" (Imaging Processes and Materials) Neblette, 8th Edition, edited by Sturge, V. Walworth, and A. Shepp, page 279, 1989) , etc.

Organic Silver Salt

Organic silver salts used in the invention are reducible silver source, and silver salts of organic acids or organic heteroacids are preferred and silver salts of long chain fatty acid (preferably having 10 to 30 carbon atom and more preferably 15 to 25 carbon atoms) or nitrogen containing heterocyclic compounds are more preferred. Specifically, organic or inorganic complexes, ligand of which have a total stability constant to a silver ion of 4.0 to 10.0 are preferred. Exemplary preferred complex salts are described in RD17029 and RD29963, including organic acid salts (for example, salts of gallic acid, oxalic acid, behenic acid, arachidic acid, stearic acid, palmitic acid, lauric acid, etc.); carboxyalkylthiourea salts (for example, 1-(3-carboxypropyl)thiourea, 1-(3-caroxypropyl)-3,3-dimethylthiourea, etc.); silver complexes of polymer reaction products of aldehyde with hydroxy-substituted aromatic carboxylic acid (for example, aldehydes (formaldehyde, acetaldehyde, butylaldehyde, etc.), hydroxy-substituted acids (for example, salicylic acid, benzoic acid, 3,5-dihydroxybenzoic acid, 5,5-thiodisalicylic acid, silver salts or complexes of thiones (for example, 3-(2-carboxyethyl)-4-hydroxymethyl-4-(thiazoline-2-thione and 3-carboxymethyl-4-thiazoline-2-thione), complexes of silver with nitrogen acid selected from imidazole, pyrazole, urazole, 1.2,4-thiazole, and 1H-tetrazole, 3-amino-5-benzylthio-1,2,4-triazole and benztriazole or salts thereof; silver salts of saccharin, 5-chlorosalicylaldoxime, etc.; and silver salts of mercaptides. Of these organic silver salts, silver salts of fatty acids are preferred, and silver salts of behenic acid is specifically preferred. A content of the organic silver salt is preferably not more than 3 g/m$^2$, and more preferably not more than 2 g/m$^2$, based on silver.

The organic silver salt compound can be obtained by mixing an aqueous-soluble silver compound with a compound capable of forming a complex with silver. Normal precipitation, reverse precipitation, double jet precipitation and controlled double jet precipitation described in JP-A 9-127643 are preferably employed.

Silver Halide

Silver halide grains contained in the coating solution functions as a light sensor. Silver halide can be prepared by adding a halide component such as sodium bromide or ammonium bromide to the silver salt dispersion described above to convert a part of the organic silver salt to silver halide through halide conversion. However, it is preferred that silver halide is separately prepared according to conventional silver halide emulsion-making techniques, and thereby the size or form of silver halide grains can be readily controlled.

In order to minimize cloudiness after image formation and to obtain excellent image quality, the less the average grain size, the more preferred, and the average grain size is preferably less than 0.1 $\mu$m, more preferably between 0.01 and 0.1 $\mu$m, and still more preferably between 0.03 and 0.08 $\mu$m. The average grain size as described herein is defined as an average edge length of silver halide grains, in cases where they are so-called regular crystals in the form of cube or octahedron. Furthermore, in cases where grains are not regular crystals, for example, spherical, cylindrical, and tabular grains, the grain size refers to the diameter of a sphere having the same volume as the silver grain. Furthermore, silver halide grains are preferably monodisperse grains. The monodisperse grains as described herein refer to grains having a monodispersibility obtained by the formula described below of less than 30%, and more preferably from 0.1 to 20%.

Monodispersibility=(standard deviation of grain diameter)/(average grain diameter)×100(%)

The silver halide grain shape is not specifically limited, but a high ratio accounted for by a Miller index [100] plane is preferred. This ratio is preferably at least 50%; is more preferably at least 70%, and is most preferably at least 80%. The ratio accounted for by the Miller index [100] face can be obtained based on T. Tani, J. Imaging Sci., 29, 165 (1985) in which adsorption dependency of a [111] face or a [100] face is utilized. Furthermore, another preferred silver halide shape is a tabular grain. The tabular grain as described herein is a grain having an aspect ratio (AR), as defined below, of at least 3. Of these, the aspect ratio is preferably between 3 and 50. The grain diameter is preferably not more than 0.1 $\mu$m, and is more preferably between 0.01 and 0.08 $\mu$m. These are described in U.S. Pat. Nos. 5,264,337, 5,314,789, 5,320, 958, and others. In the present invention, when these tabular grains are used, image sharpness is further improved.

The halide composition of silver halide grains is not specifically limited and may be any one of silver chloride, silver chlorobromide, silver iodochlorobromide, silver bromide, silver iodobromide and silver iodide. Silver halide emulsions used in the invention can be prepared according to the methods described in P. Glafkides, Chimie Physique Photographique (published by Paul Montel Corp., 19679; G. F. Duffin, Photographic Emulsion Chemistry (published by Focal Press, 1966); V. L. Zelikman et al., Making and Coating of Photographic Emulsion (published by Focal Press, 1964). Any one of acidic precipitation, neutral precipitation and ammoniacal precipitation is applicable and the reaction mode of aqueous soluble silver salt and halide salt includes single jet addition, double jet addition and a combination thereof. Silver halide may be incorporated into the image forming layer by any means so that the silver halide is arranged so as to be close to reducible silver source. The silver halide may be formed by reaction of an organic silver salt and a halide ion to convert a part of the organic silver salt to silver halide. Alternatively, silver halide which has been prepared in advance may be added to a solution to prepare an organic silver salt. A combination of these may be applicable bur the latter is preferred. The content of silver halide is preferably 0.75 to 30% by weight, based on an organic silver salt.

Silver halide preferably occludes ions of metals belonging to Groups 6 to 11 of the Periodic Table. Preferred as the metals are W; Fe, Co, Ni, Cu, Ru, Rh, Pd, Re, Os, Ir, Pt and Au. These metals may be introduced into silver halide in the form of a complex. In the present invention, the transition metal complexes are preferably six-coordinate complexes represented by the general formula described below are preferred:

Formula: $(ML_6)^m$:

wherein M represents a transition metal selected from elements in Groups 6 to 11 of the Periodic Table; L represents a coordinating ligand; and m represents 0, 1-, 2-, 3- or 4-. Exemplary examples of the ligand represented by L include halides (fluoride, chloride, bromide, and iodide), cyanide, cyanato, thiocyanato, selenocyanato, tellurocyanato, azido and aquo, nitrosyl, thionitrosyl, etc., of which aquo, nitrosyl and thionitrosyl are preferred. When the aquo ligand is present, one or two ligands are preferably coordinated. L may be the same or different.

The particularly preferred example of M is rhodium (Rh), ruthenium (Ru), rhenium (Re), iridium (Ir) or osmium (Os).

Exemplary examples of transition metal ligand complexes are shown below:
1: $[RhCl_6]^{3-}$
2: $[RuCl_6]^{3-}$
3: $[ReCl_6]^{3-}$
4: $[RuBr_6]^{3-}$
5: $[OSCl_6]^{3-}$
6: $[IrCl_6]^{4-}$
7: $[Ru(NO)Cl_5]^{2-}$
8: $[RuBr_4(H_2O)]^{2-}$
9: $[Ru(NO)(H_2O)Cl_4]^-$
10: $[RhCl_5(H_2O)]^{2-}$
11: $[Re(NO)Cl_5]^{2-}$
12: $[Re(NO)CN_5]^{2-}$
13: $[Re(NO)ClCN_4]^{2-}$
14: $[Rh(NO)_2Cl_4]^-$
15: $[Rh(NO)(H_2O)Cl_4]^-$
16: $[Ru(NO)CN_5]^{2-}$
17: $[Fe(CN)_6]^{3-}$
18: $[Rh(NS)Cl_5]^{2-}$
19: $[Os(NO)Cl_5]^{2-}$
20: $[Cr(NO)Cl_5]^{2-}$
21: $[Re(NO)Cl_5]^-$
22: $[Os(NS)Cl_4(TeCN)]^{2-}$
23: $[Ru(NS)Cl_5]^{2-}$
24: $[Re(NS)Cl_4(SeCN)]^{2-}$
25: $[Os(NS)Cl(SCN)_4]^{2-}$
26: $[Ir(NO)Cl_5]^{2-}$ One type of these metal ions or complex ions may be employed and the same type of metals or the different type of metals may be employed in combinations of two or more types. Generally, the content of these metal ions or complex ions is suitably between $1\times10^{-9}$ and $1\times10^{-2}$ mole per mole of silver halide, and is preferably between $1\times10^{-8}$ and $1\times10^{-4}$ mole. Compounds, which provide these metal ions or complex ions, are preferably incorporated into silver halide grains through addition during the silver halide grain formation. These may be added during any preparation stage of the silver halide grains, that is, before or after nuclei formation, growth, physical ripening, and chemical ripening. However, these are preferably added at the stage of nuclei formation, growth, and physical ripening; furthermore, are preferably added at the stage of nuclei formation and growth; and are most preferably added at the stage of nuclei formation. These compounds may be added several times by dividing the added amount. Uniform content in the interior of a silver halide grain can be carried out. As disclosed in JP-A No. 63-29603, 2-306236, 3-167545, 4-76534, 6-110146, 5-273683, the metal can be distributedly occluded in the interior of the grain. These metal compounds can be dissolved in water or a suitable organic solvent (for example, alcohols, ethers, glycols, ketones, esters, amides, etc.) and then added. Furthermore, there are methods in which, for example, an aqueous metal compound powder solution or an aqueous solution in which a metal compound is dissolved along with NaCl and KCl is added to a water-soluble silver salt solution during grain formation or to a water-soluble halide solution; when a silver salt solution and a halide solution are simultaneously added, a metal compound is added as a third solution to form silver halide grains, while simultaneously mixing three solutions; during grain formation, an aqueous solution comprising the necessary amount of a metal compound is placed in a reaction vessel; or during silver halide preparation, dissolution is carried out by the addition of other silver halide grains previously doped with metal ions or complex ions. Specifically, the preferred method is one in which an aqueous metal compound powder solution or an aqueous solution in which a metal compound is dissolved along with NaCl and KCl is added to a water-soluble halide solution. When the addition is carried out onto grain surfaces, an aqueous solution comprising the necessary amount of a metal compound can be placed in a reaction vessel immediately after grain formation, or during physical ripening or at the completion thereof or during chemical ripening.

Reducing Agent

Commonly known reducing agents are used in thermally developable photothermographic materials, including phenols, polyphenols having two or more phenols, naphthols, bisnaphthols, polyhydoxybenzenes having two or more hydroxy groups, polyhydoxynaphthalenes having two or more hydroxy groups, ascorbic acids, 3-pyrazolidones, pyrazoline-5-ones, pyrazolines, phenylenediamines, hydroxyamines, hydroquinone monoethers, hydrooxamic acids, hydrazides, amidooximes, and N-hydroxyureas. Further, exemplary examples thereof are described in U.S. Pat. Nos. 3,615,533, 3,679,426, 3,672,904, 3,51,252, 3,782, 949, 3,801,321, 3,794,488, 3,893,863, 3,887,376, 3,770,448, 3,819,382, 3,773,512, 3,839,048, 3,887,378, 4,009,039, and 4,021,240; British Patent 1,486,148; Belgian Patent 786, 086; JP-A 50-36143, 50-36110, 50-116023, 50-99719, 50-140113, 51-51933, 51-23721, 52-84727; and JP-B 51-35851.

Of these reducing agents, in cases where fatty acid silver salts are used as an organic silver salt, preferred reducing agents are polyphenols in which two or more phenols are linked through an alkylene group or a sulfur atom, specifically, polyphenols in which two or more phenols are linked through an alkylene group or a sulfur atom and the phenol(s) are substituted at least a position adjacent to a hydroxy group by an alkyl group (e.g., methyl, ethyl, propyl, t-butyl, cyclohexyl) or an acyl group (e.g., acetyl, propionyl). Examples thereof include polyphenols compounds such as 1,1-bis(2-hydroxy-3,5-dimethylphenyl)-3,5, 5-trimethylhexane, 1,1-bis(2-hydroxy-3-t-butyl-5-methyphenyl)methane, 1,1-bis(2-hydroxy-3,5-di-t-butylphenyl)methane, 2-hydroxy-3-t-butyl-5-methylphenyl)-(2-hydroxy-5-methylphenyl)methane, 6,6'-benzylidene-bis(2,4-di-t-butylphenol), 6,6'-benzylidene-bis (2-t-butyl-4-methylphenol), 6,6'-benzylidene-bis(2,4-dimethylphenol), 1,1-bis(2-hydroxy-3,5-dimethylphenyl)-2-methylpropane, 1,1,5,5-tetrakis(2-hydroxy-3,5-dimethylphenyl)-2,4-ethylpentane, 2,2-bis(4-hydroxy-3,5-dimethylphenyl)propane, 2,2-bis(4-hydroxy-3,5-di-t-butylphenyl)propane, as described in U.S. Pat. Nos. 3,589, 903 and 4,021,249, British Patent 1,486,148, JP-A 51-51933, 50-36110 and 52-84727 and JP-B 51-35727; bisnaphthols described in U.S. Pat. No. 3,672,904, such as 2,2'dihydoxy-1,1'-binaphthyl, 6,6'-dibromo-2,2'-dihydroxy-1,1'-binaphthyl, 6,6'-dinitro-2,2'-dihydroxy-1,1'-binaphtyl, bis(2-hydroxy-1-naphthyl)methane, 4,4'-dimethoxy-1,1'-dihydroxy-2,2'-binaphthyl; sulfonamidophenols or sulfonamidonaphthols described in U.S. Pat. No. 3,801,321, such as 4-benzenesulfonamidophenol, 2-benzenesulfonamidophenol, 2,6-dichloro-4-benzenesulfonamidophenol and 4-benzenesulfonamidophenol.

The amount of the reducing agent to be used in the thermally developable photothermographic material, depending on the kind of an organic silver salt or reducing agent is preferably 0.05 to 10 mol, and more preferably 0.1 to 3 mol per mol of organic silver salt. Two or more kinds of reducing agents may be used in combination within the amount described above. It is also preferred to add the reducing agent to a photosensitive coating solution immediately before coating, in terms of reduced variation in photographic performance occurred during standing.

Nucleating Agent

The photothermographic material used in the invention preferably contains hydrazine derivatives as a nucleating agent. Preferred hydrazine derivatives are represented by the following formula (H):

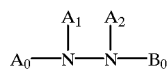

Formula (H)

wherein $A_0$ is an aliphatic group, aromatic group, heterocyclic group, each of which may be substituted, or —$G_0$–$D_0$ group; $B_0$ is a blocking group; $A_1$ and $A_2$ are both hydrogen atoms, or one of them is a hydrogen atom and the other is an acyl group, a sulfonyl group or an oxalyl group, in which $G_0$ is a —CO—, —COCO—, —CS—, —C(=$NG_1D_1$)—, —SO—, —$SO_2$— or —P(O)($G_1D_1$)— group, in which $G_1$ is a linkage group, or a —O—, —S— or —N($D_1$)— group, in which $D_1$ is a hydrogen atom, or an aliphatic group, aromatic group or heterocyclic group, provided that when a plural number of $D_1$ are present, they may be the same with or different from each other and $D_0$ is an aliphatic group, aromatic group, heterocyclic group, amino group, alkoxy group, aryloxy group, alkylthio group or arylthio group.

In Formula (H), an aliphatic group represented by $A_0$ of formula (H) is preferably one having 1 to 30 carbon atoms, more preferably a straight-chained, branched or cyclic alkyl group having 1 to 20 carbon atoms. Examples thereof are methyl, ethyl, t-butyl, octyl, cyclohexyl and benzyl, each of which may be substituted by a substituent (such as an aryl, alkoxy, aryloxy, alkylthio, arylthio, sulfooxy, sulfonamido, sulfamoyl, acylamino or ureido group).

An aromatic group represented by $A_0$ of formula (H) is preferably a monocyclic or condensed-polycyclic aryl group such as a benzene ring or naphthalene ring. A heterocyclic group represented by $A_0$ of formula (H) is preferably a monocyclic or condensed-polycyclic one containing at least one hetero-atom selected from nitrogen, sulfur and oxygen such as a pyrrolidine-ring, imidazole-ring, tetrahydrofuran-ring, morpholine-ring, pyridine-ring, pyrimidine-ring, quinoline-ring, thiazole-ring, benzthiazole-ring, thiophene-ring or furan-ring. In the —$G_0$–$D_0$ group represented by $A_0$, $G_0$ is a —CO—, —COCO—, —CS—, —C(=$NG_1D_1$)—, —SO—, —$SO_2$— or —P(O)($G_1D_1$)— group, in which $G_1$ is a linkage group, or a —O—, —S— or —N($D_1$)— group, in which $D_1$ is a hydrogen atom, or an aliphatic group, aromatic group or heterocyclic group, provided that when a plural number of $D_1$ are present, they may be the same with or different from each other and $D_0$ is an aliphatic group, aromatic group, heterocyclic group, amino group, alkoxy group, aryloxy group, alkylthio group or arylthio group, and preferred $D_0$ is a hydrogen atom, or an alkyl alkoxyl or amino group. The aromatic group, heterocyclic group or —$G_0$–$D_0$ group represented by $A_0$ each may be substituted. Specifically preferred AO is an aryl group or —$G_0$–$D_0$ group.

$A_0$ contains preferably a non-diffusible group or a group for promoting adsorption to silver halide. As the non-diffusible group is preferable a ballast group used in immobile photographic additives such as a coupler. The ballast group includes an alkyl group, alkenyl group, alkynyl group, alkoxy group, phenyl group, phenoxy group and alkylpheoxy group, each of which has 8 or more carbon atoms and is photographically inert.

The group for promoting adsorption to silver halide includes a thioureido group, thiourethane, mercapto group, thioether group, thione group, heterocyclic group, thioamido group, mercapto-heterocyclic group or a adsorption group as described in JP A 64-90439.

In Formula (H), $B_0$ is a blocking group, and preferably —$G_0$–$D_0$, wherein $G_0$ is a —CO—, —COCO—, —CS—, —C(=$NG_1D_1$)—, —SO—, —$SO_2$— or —P(O)($G_1D_1$)— group, and preferred $G_0$ is a —CO—, —COCOA—, in which $G_1$ is a linkage, or a —O—, —S— or —N($D_1$)— group, in which $D_1$ represents a hydrogen atom, or an aliphatic group, aromatic group or heterocyclic group, provided that when a plural number of $D_1$ are present, they may be the same with or different from each other. $D_0$ is an aliphatic group, aromatic group, heterocyclic group, amino group, alkoxy group or mercapto group, and preferably, a hydrogen atom, or an alkyl, alkoxyl or amino group. $A_1$ and $A_2$ are both hydrogen atoms, or one of them is a hydrogen atom and the other is an acyl group, (acetyl, trifluoroacetyl and benzoyl), a sulfonyl group (methanesulfonyl and toluenesulfonyl) or an oxalyl group (ethoxalyl).

A compound represented by formula [H] is exemplified as below, but the present invention is not limited thereto.

H-1

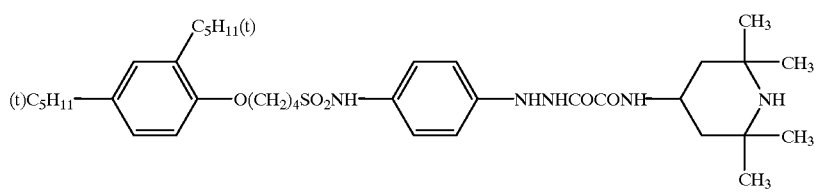

-continued
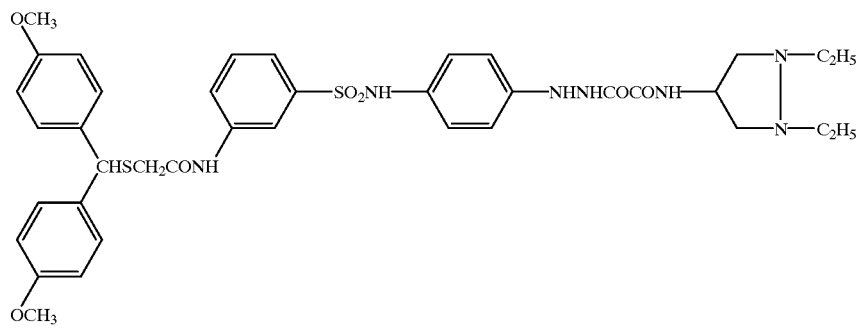
H-2
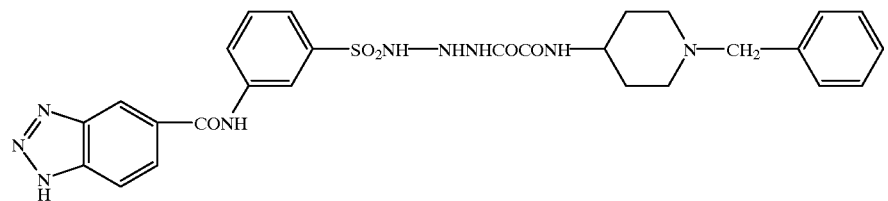
H-3
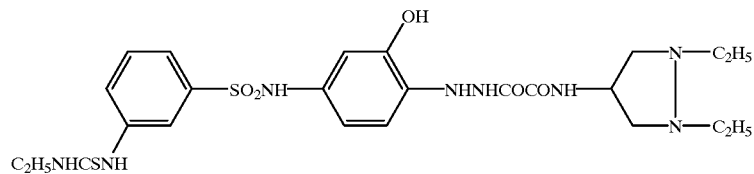
H-4
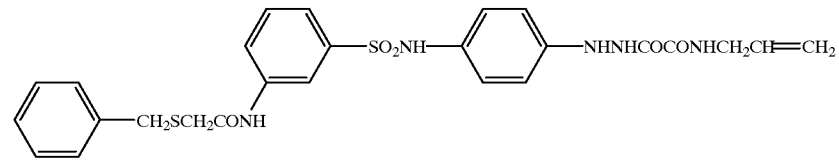
H-5
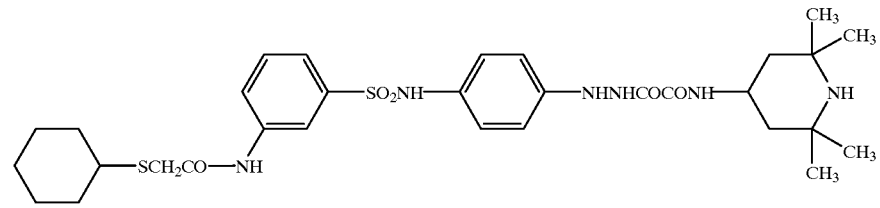
H-6
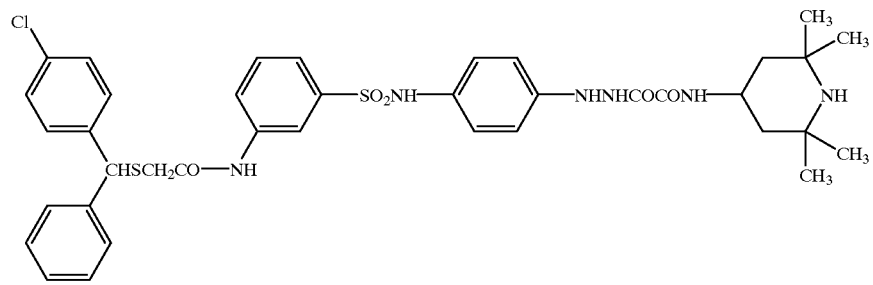
H-7

-continued
H-8
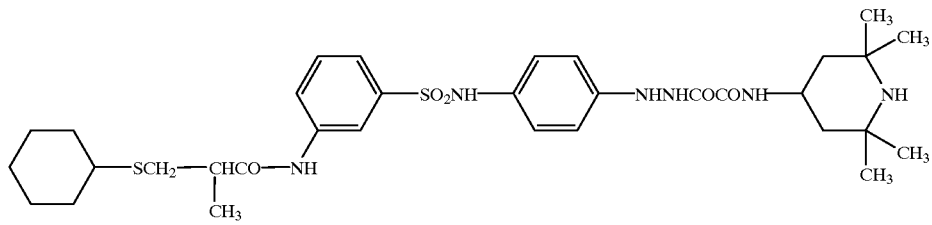
H-9
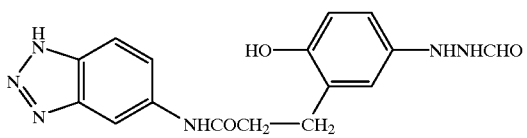
H-10
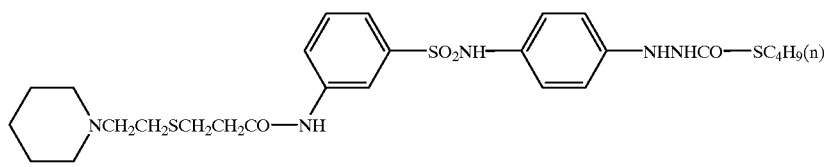
H-11
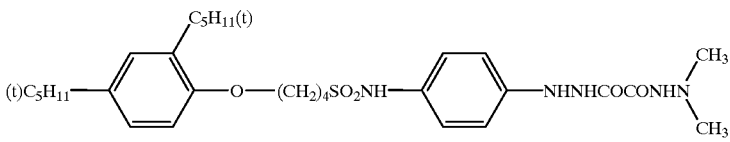
H-12
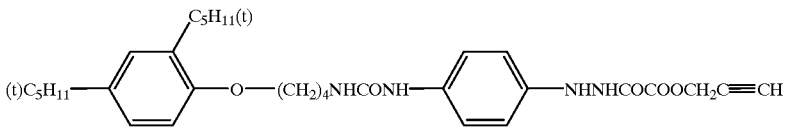
H-13
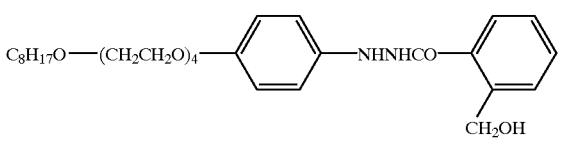
H-14
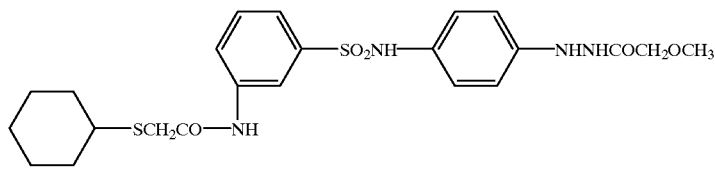
H-15
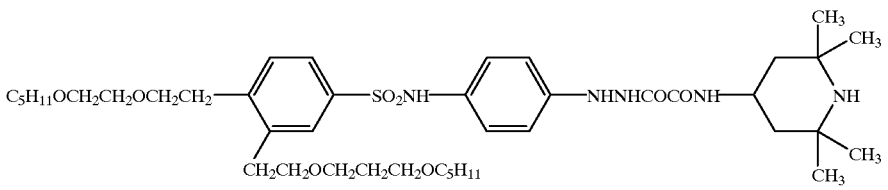
H-16
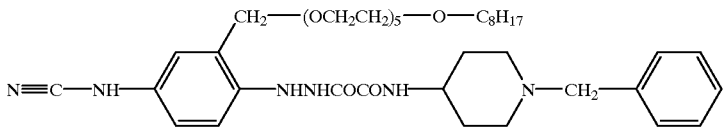

-continued
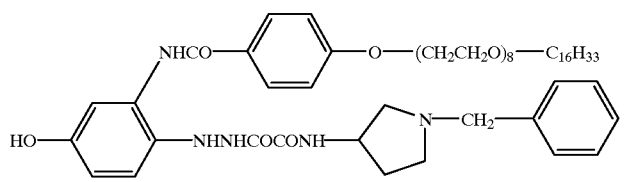
H-17
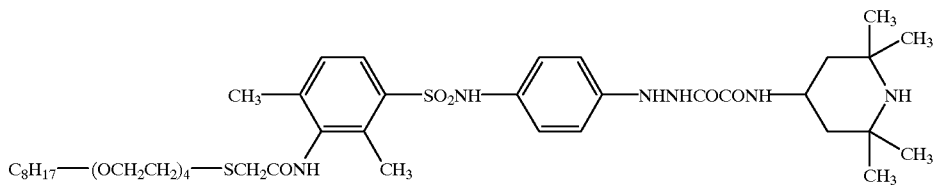
H-18
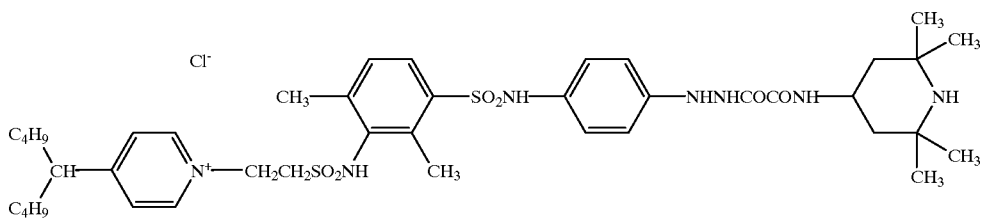
H-19
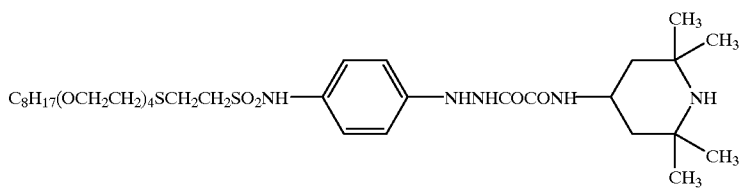
H-20
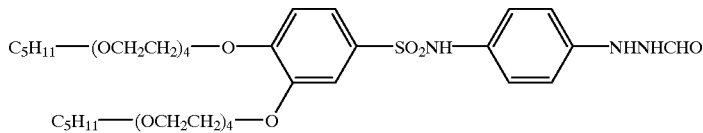
H-21
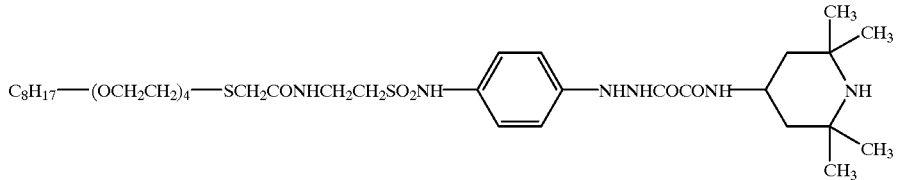
H-22
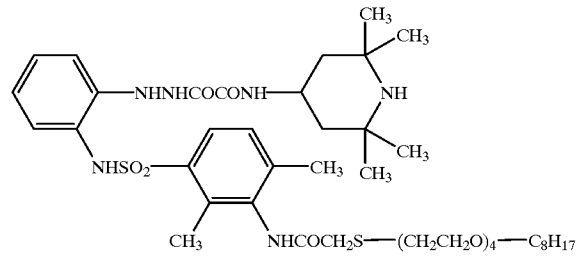
H-23

H-24
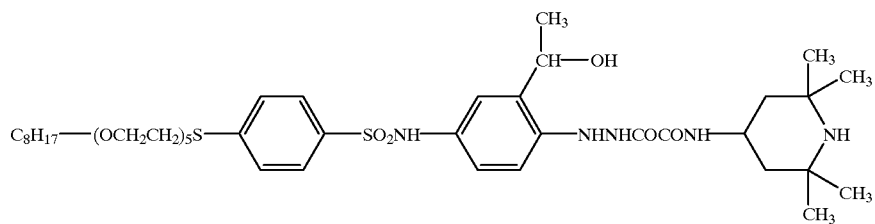

H-25
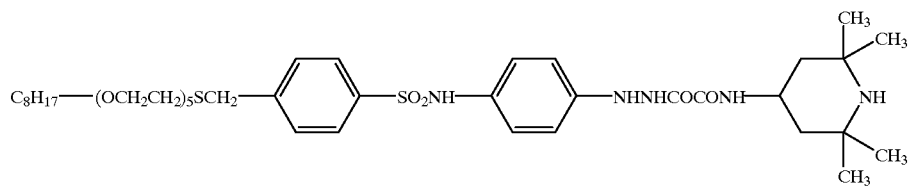

H-26
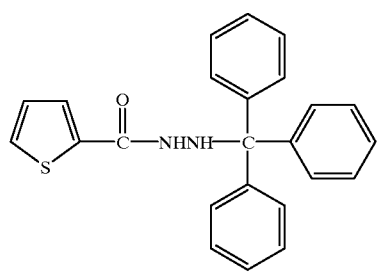

H-27

H-28
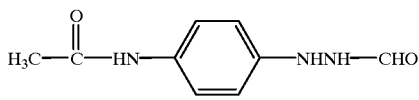

H-29
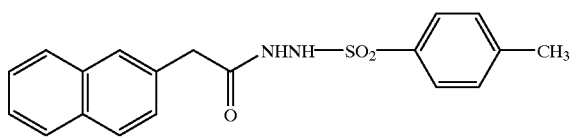

H-30
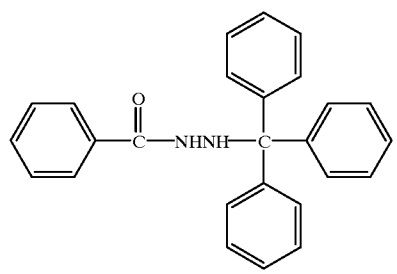

Furthermore, preferred hydrazine derivatives include compounds H-1 through H-29 described in U.S. Pat. No. 5,545,505, col. 11 to col. 20; and compounds 1 to 12 described in U.S. Pat. No. 5,464,738, col. 9 to col. 11.

These hydrazine derivatives can be synthesized in accordance with commonly known methods. The hydrazine derivative is incorporated into a photosensitive layer containing a silver halide emulsion and/or a layer adjacent thereto. The amount to be incorporated, depending of a silver halide grain size, halide composition, a degree of chemical sensitization and the kind of an antifoggant, is preferably $10^{-6}$ to $10^{-1}$, and more preferably $10^{-5}$ to $10^{-2}$ mole per mole of silver halide.

Nucleation Promoting Agent

It is preferred to incorporate to the photothermographic material a contrast increase promoting agent (or nucleation promoting agent), including hydroxylamine compounds, alkanolamine compounds and ammonium phthalate compounds described in U.S. Pat. No. 5,545,505; hydroxamic acid compounds described in U.S. Pat. No. 5,545,507; N-acyl-hydrazine compounds described in U.S. Pat. No. 5,558,983; acrylonirile compounds described in U.S. Pat. No. 5,545,515; hydrogen atom donor compounds such as benzhydrol, diphenylphosphine, dialkylpiperidine or alkyl-β-ketoester described in U.S. Pat. No. 5,545,515. Of these are preferred a quaternary onium compound represented by the following formula (P) and an amino compound represented by the following formula (Na):

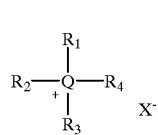

Formula (P)

wherein Q is a nitrogen atom or a phosphorus atom; $R_1$, $R_2$, $R_3$ and $R_4$ are each a hydrogen atom or a substituent; $X^-$ is an anion, provided that $R_1$ to $R_4$ may be linked together with each other to form a ring:

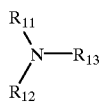

Formula (Na)

In formula (H), $R_{11}$, $R_{12}$, and $R_{13}$ are each a hydrogen atom, an alkyl group, a substituted alkyl group, an alkenyl group, a substituted alkenyl group, an alkynyl group, an aryl group, a substituted aryl group, saturated or unsaturated heterocyclic group, provided that $R_{11}$, $R_{12}$ and $R_{13}$ may be linked together with each other to form a ring. In this case, $R_{11}$, $R_{12}$, and $R_{13}$ are not hydrogen atoms at the same time. Specifically, an aliphatic tertiary amine compound is preferred. These compounds preferably contain a non-diffusible group or a group for promoting adsorption to silver halide. As the non-diffusible group is preferable a ballast group having a molecular weight of at least 100, and more preferably at least 300, including the ballast groups as defined in $A_0$ of formula (H). Preferred groups for promoting adsorption to silver halide include a heterocyclic ring, mercapto group, thione group, and thiourea group.

Further preferred nucleation promoting agent is represented by the following formula (Na2):

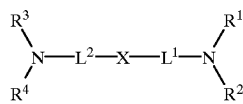

Formula (Na2)

wherein $R^1$, $R^2$, $R^3$ and $R^4$ are each a hydrogen atom, an alkyl group, substituted alkyl group, an alkenyl group, an a substituted alkenyl group, an alkynyl group, an aryl group, a substituted aryl group, saturated or unsaturated heterocyclic group, and these group may be linked together with each other to form a ring, provided that $R^1$ and $R^2$, or $R^3$ and $R^4$ are not hydrogen atoms at the same time; and X is S, Se or Te. $L_1$ and $L_2$ are each a linkage group and exemplary examples thereof include:
—$CH_2$—, —CH=CH—, —$C_2H_4$—, pyridine-di-yl, —N($Z_1$)—, —O—, —S—, —(CO)—, —($SO_2$)— and —$CH_2O$—,
in which $Z_1$ is a hydrogen atom, an alkyl group or an aryl group and these groups each may be substituted.

The linkage group represented by $L_1$ and $L_2$ preferably contain at least one of the following structures:
—[$CH_2CH_2O$]—, —[C($CH_3$)$HCH_2O$]—, —[OC($CH_3$)$HCH_2O$]— and —[O$CH_2$C(OH)$HCH_2$]—

Exemplary examples of the nucleation promoting agents represented by formula (Na) or (Na2) are shown below, but are not limited to these.

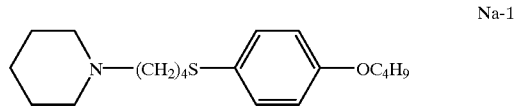

Na-1

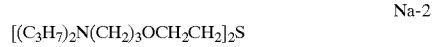

Na-2

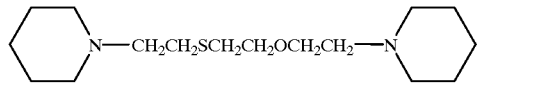

Na-3

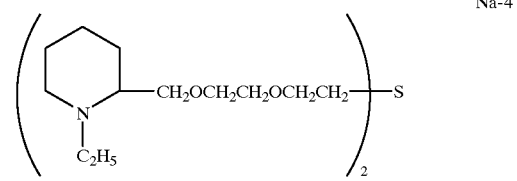

Na-4

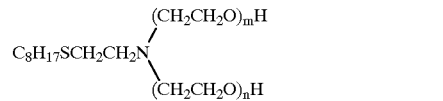

Na-5

$m + n = 20$

Na-6

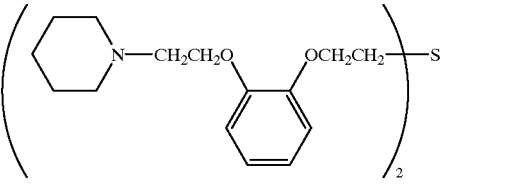

Na-7

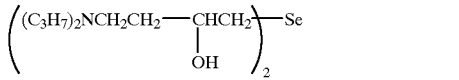

Na-8

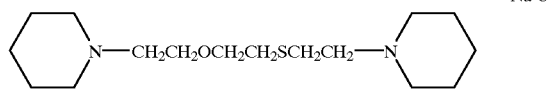

Na-9

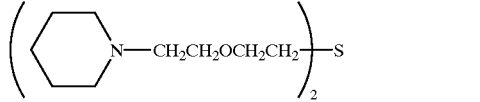

Na-10

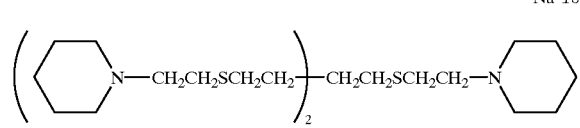

Na-11

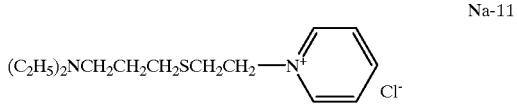

Na-12

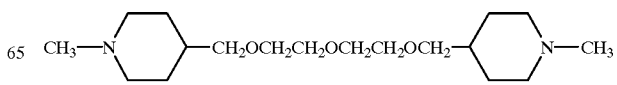

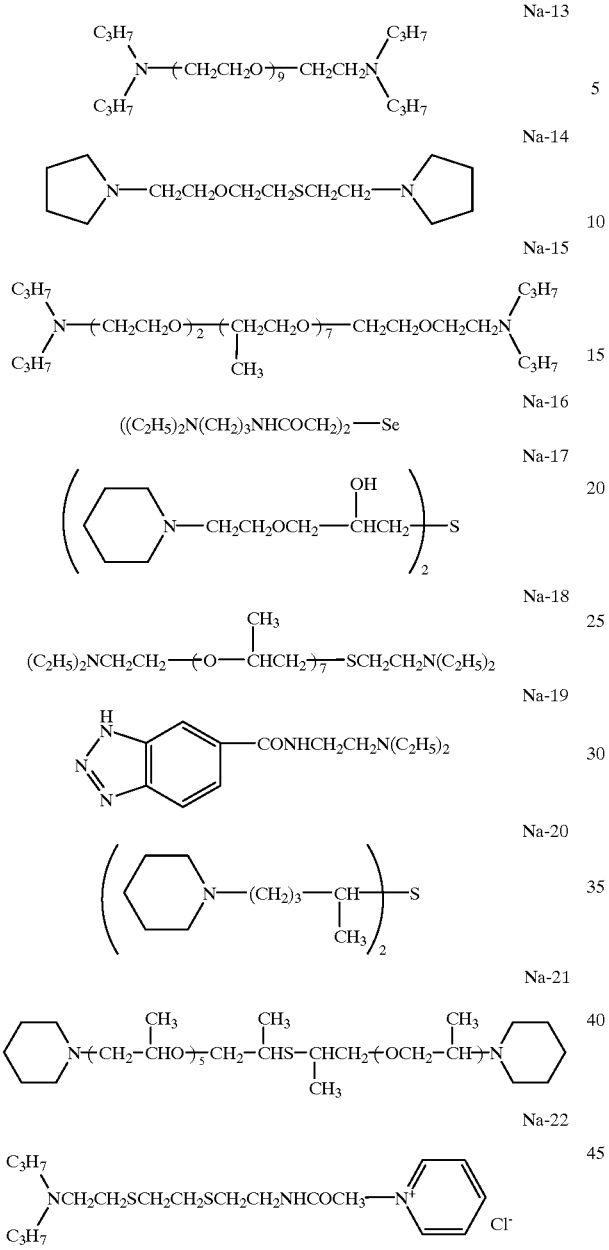

In formula (P), substituents represented by $R_1$ through $R_4$ include an alkyl group (e.g., methyl, ethyl, propyl, butyl, hexyl, cyclohexyl), an alkenyl group (e.g., allyl, butenyl), an alkynyl group (e.g., propargyl, butynyl), an aryl group (e.g., phenyl, naphthyl), a heterocyclic group (e.g., piperidyl, piperazyl, morpholyl, pyridyl, furyl, thienyl, tetrahydrofuryl, tetrahydrothienyl, sulfolanyl) and amino group. Examples of the ring formed by linking of $R_1$ through $R_4$ include a piperidine ring, morpholine ring, piperazine ring, quinuclidine ring, pyridine ring, pyrrole ring, imidazole ring, and tetrazole ring. The group represented by $R_1$ through $R_4$ may be substituted by a substituent, such as a hydroxy group, alkoxyl group, aryloxy group, carboxy group, sulfo group, alkyl group and aryl group. $R_1$, $R_2$, $R_3$ and $R_4$ are preferably a hydrogen atom or an alkyl group. Anions represented by X— include inorganic or organic anions such as halide ion, sulfate ion, nitrate ion, acetate ion, and p-toluenesulfonate ion.

More preferred compounds are represented by the following formulas (Pa), (Pb) and (Pc) or formula (T):

Formula (Pa)

Formula (Pb)

Formula (Pc)

wherein $A^1$, $A^2$, $A^3$, $A^4$ and $A^5$ are each a nonmetallic atom group necessary to form a nitrogen containing heterocyclic ring, which may further contain an oxygen atom, nitrogen atom and a sulfur atom and which may condense with a benzene ring. The heterocyclic ring formed by $A^1$, $A^2$, $A^3$, $A^4$ or $A^5$ may be substituted by a substituent. Examples of the substituent include an alkyl group, an aryl group, an aralkyl group, alkenyl group, alkynyl group, a halogen atom, an acyl group, an alkoxycarbonyl group, an aryloxycarbonyl group, a sulfo group, hydroxy, an alkoxyl group, an aryloxy group, an amido group, a sulfamoyl group, a carbamoyl group, a ureido group, an amino group, a sulfonamido group, cyano, nitro, a mercapto group, an alkylthio group, and an arylthio group. Exemplary preferred $A^1$, $A^2$, $A^3$, $A^4$ and $A^5$ include a 5- or 6-membered ring (e.g., pyridine, imidazole, thiazole, oxazole, pyrazine, pyrimidine) and more preferred is a pyridine ring.

Bp is a divalent linkage group, and m is 0 or 1. Examples of the divalent linkage group include an alkylene group, arylene group, alkenylene group, —$SO_2$—, —SO—, —O—, —S—, —CO—, —N($R^6$)—, in which $R^6$ is a hydrogen atom, an alkyl group or aryl group. These groups may be included alone or in combination. Of these, Bp is preferably an alkylene group or alkenylene group.

$R^1$, $R^2$ and $R^5$ are each an alkyl group having 1 to 20 carbon atoms, and $R^1$ and $R^2$ may be the same. The alkyl group may be substituted and substituent thereof are the same as defined in $A^1$, $A^2$, $A^3$, $A^4$ and $A^5$. Preferred $R^1$, $R^2$ and $R^5$ are each an alkyl group having 4 to 10 carbon atoms, and more preferably an aryl-substituted alkyl group, which may be substituted.

Xp$^-$ is a counter ion necessary to counterbalance overall charge of the molecule, such as chloride ion, bromide ion, iodide ion, sulfate ion, nitrate ion and p-toluenesulfonate; $n_p$ is a counter ion necessary to counterbalance overall charge of the molecule and in the case of an intramolecular salt, $n_p$ is 0.

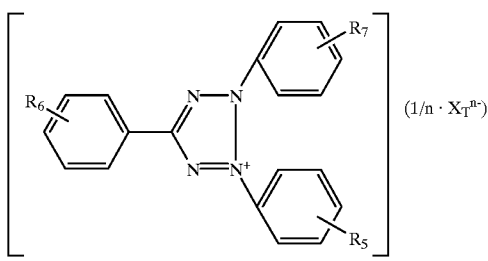

Formula (T)

$(1/n \cdot X_T^{n-})$

In formula (T), substituent groups $R_5$, $R_6$ and $R_7$, substituted on the phenyl group are preferably a hydrogen atom or a group, of which Hammett's σ-value exhibiting a degree of electron attractiveness is negative.

The σ values of the substituent on the phenyl group are disclosed in lots of reference books. For example, a report by C. Hansch in "The Journal of Medical Chemistry", vol.20, on page 304(1977), etc. can be mentioned. Groups showing particularly preferable negative σ-values include, for example, methyl group ($\sigma_p=-0.17$, and in the following, values in the parentheses are in terms of $\sigma_p$ value), ethyl group(−0.15), cyclopropyl group(−0.21), n-propyl group(−0.13), iso-propyl group(−0.15), cyclobutyl group(−0.15), n-butyl group(−0.16), iso-butyl group(−0.20), n-pentyl group(−0.15), n-butyl group(−0.16), iso-butyl group(−0.20), n-pentyl group(−0.15), cyclohexyl group(−0.22), hydroxyl group(−0.37), amino group(−0.66), acetylamino group(−0.15), butoxy group(−0.32), pentoxy group(−0.34), etc. can be mentioned. All of these groups are useful as the substituent for the compound represented by the formula T according to the present invention; n is 1 or 2, and as anions represented by $X_T^{n-}$ for example, halide ions such as chloride ion, bromide ion, iodide ion, etc.; acid radicals of inorganic acids such as nitric acid, sulfuric acid, perchloric acid, etc.; acid radicals of organic acids such as sulfonic acid, carboxylic acid, etc.; anionic surface active agents, including lower alkyl benzenesulfonic acid anions such as p-toluenesulfonic anion, etc.; higher alkylbenzene sulfonic acid anions such as p-dodecyl benzenesulfonic acid anion, etc.; higher alkyl sulfate anions such as lauryl sulfate anion, etc.; Boric acid-type anions such as tetraphenyl borone, etc.; dialkylsulfo succinate anions such as di-2-ethylhexylsulfo succinate anion, etc.; higher fatty acid anions such as cetyl polyetheoxysulfate anion, etc.; and those in which an acid radical is attached to a polymer, such as polyacrylic acid anion, etc. can be mentioned.

Exemplary examples of the quaternary onium compounds are shown below, but are not limited to these.

P-1

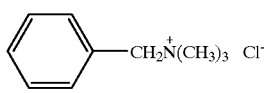

P-2

P-3

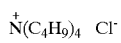

P-4

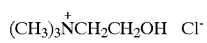

P-5

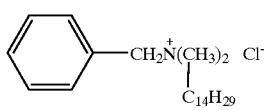

P-6

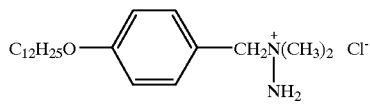

P-7

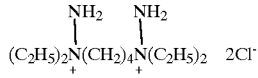

P-8

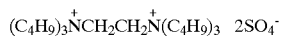

P-9

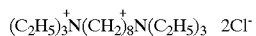

P-10

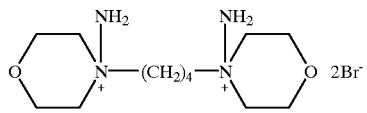

-continued
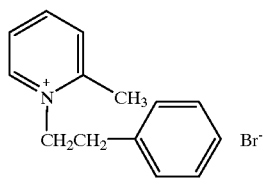 P-11
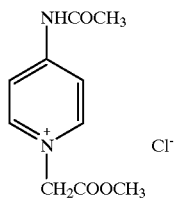 P-12
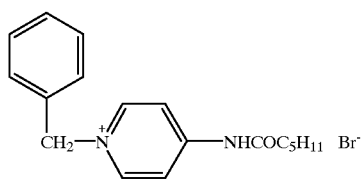 P-13
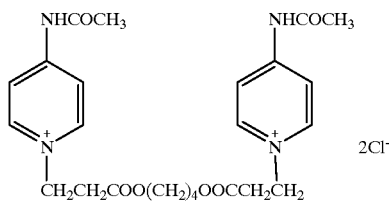 P-14
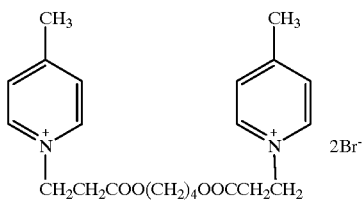 P-15
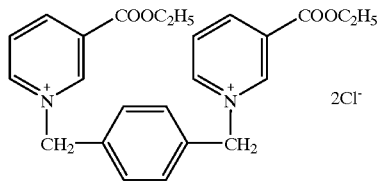 P-16
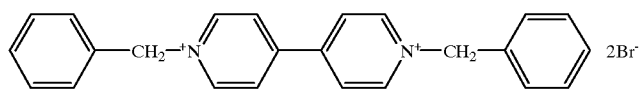 P-17
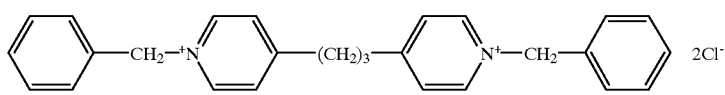 P-18
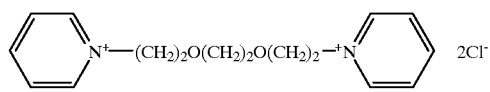 P-19

-continued
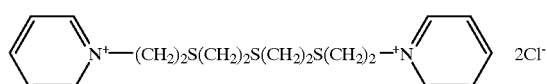  P-20
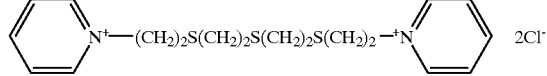  P-21
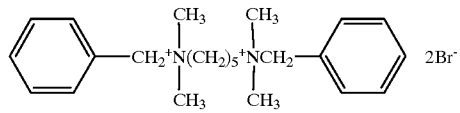  P-22
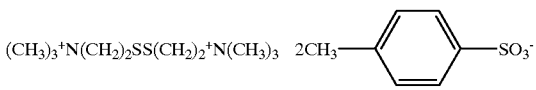  P-23
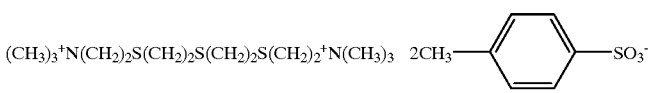  P-24
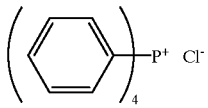  P-25
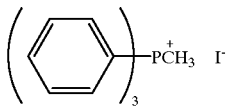  P-26
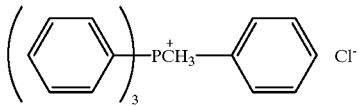  P-27
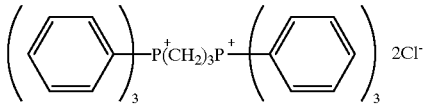  P-28
  P-29
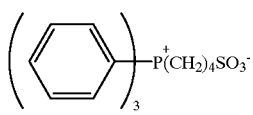  P-30
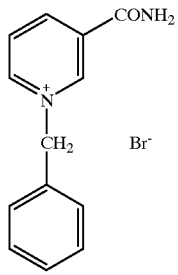

-continued
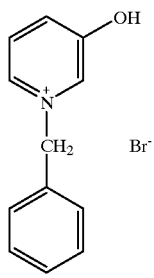
P-31
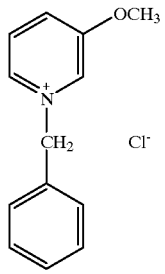
P-32
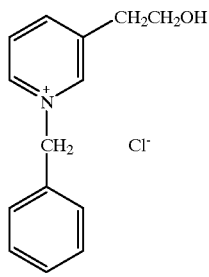
P-33
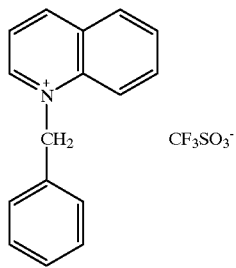
P-34
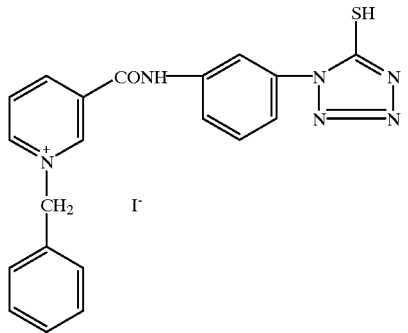
P-35

-continued
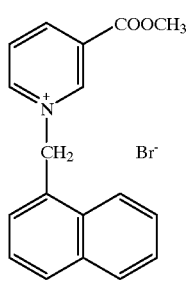
P-36
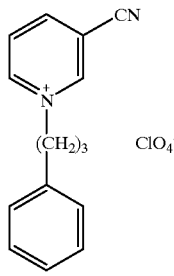
P-37
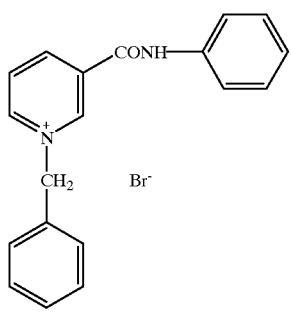
P-38
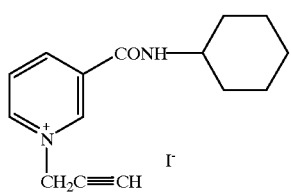
P-39
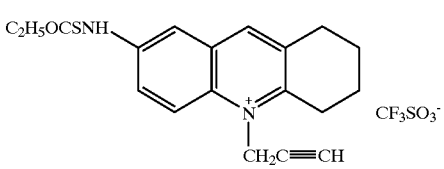
P-40
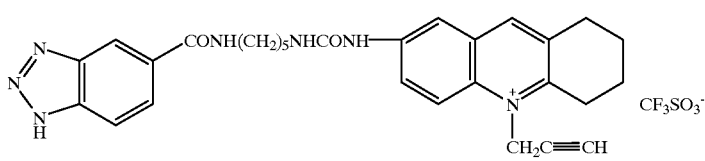
P-41
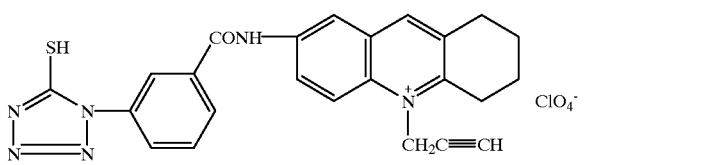
P-42

-continued
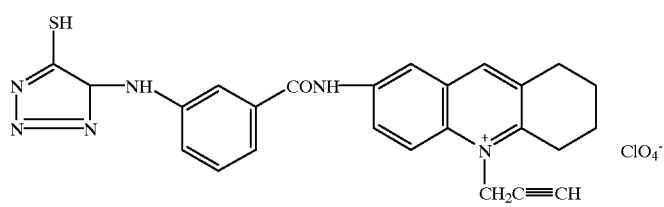
P-43
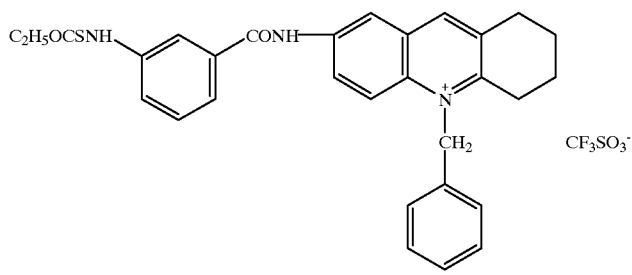
P-44
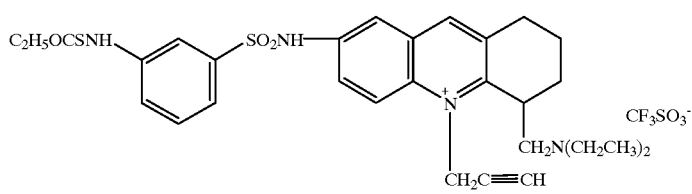
P-45
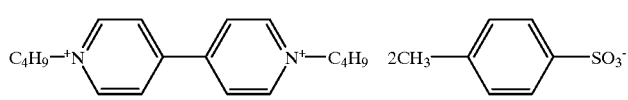
P-46
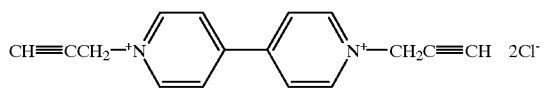
P-47
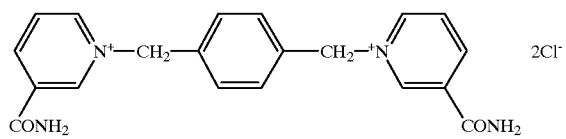
P-48
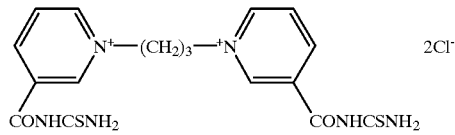
P-49
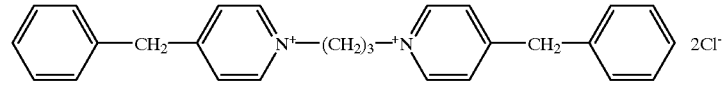
P-50
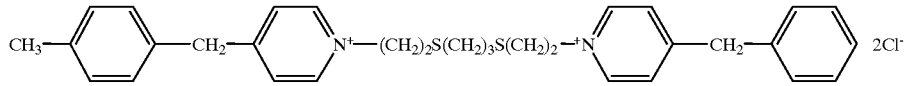
P-51
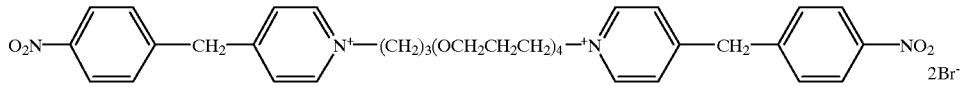
P-52

-continued

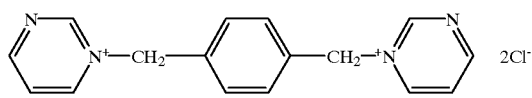

P-53

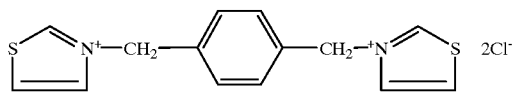

P-54

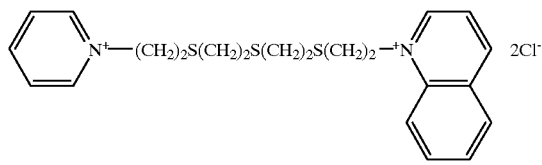

P-55

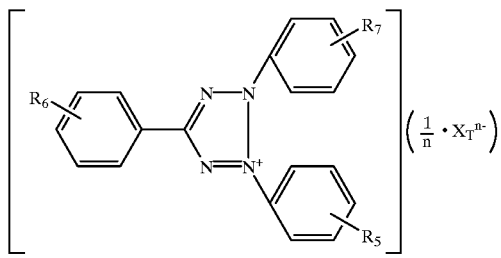

| Compd. No. | $R_5$ | $R_6$ | $R_7$ | $X_T^{n-}$ |
|---|---|---|---|---|
| T-1 | H | H | p-CH$_3$ | — |
| T-2 | p-CH$_3$ | H | p-CH$_3$ | — |
| T-3 | p-CH$_3$ | p-CH$_3$ | p-CH$_3$ | — |
| T-4 | H | p-CH$_3$ | p-CH$_3$ | — |
| T-5 | p-OCH$_3$ | p-CH$_3$ | p-CH$_3$ | — |
| T-6 | p-OCH$_3$ | H | p-CH$_3$ | — |
| T-7 | p-OCH$_3$ | H | p-OCH$_3$ | — |
| T-8 | m-C$_2$H$_5$ | H | m-C$_2$H$_5$ | — |
| T-9 | p-C$_2$H$_5$ | p-C$_2$H$_5$ | p-C$_2$H$_5$ | — |
| T-10 | p-C$_3$H$_7$ | H | p-C$_3$H$_7$ | — |
| T-11 | p-isoC$_3$H$_7$ | H | p-isoC$_3$H$_7$ | — |
| T-12 | p-OC$_2$H$_5$ | H | p-OC$_2$H$_5$ | — |
| T-13 | p-OCH$_3$ | H | p-isoC$_3$H$_7$ | — |
| T-14 | H | H | p-nC$_{12}$H$_{25}$ | — |
| T-15 | p-nC$_{12}$H$_{25}$ | H | p-nC$_{12}$H$_{25}$ | — |
| T-16 | H | p-NH$_2$ | H | — |
| T-17 | p-NH$_2$ | H | H | — |
| T-18 | p-CH$_3$ | H | p-CH$_3$ | — |

The quaternary onium compounds described above can be readily synthesized according to the methods commonly known in the art. For example, the tetrazolium compounds described above may be referred to Chemical Review 55, page 335–483.

The quaternary onium compound is incorporated preferably in an amount of $1 \times 10^{-8}$ to 1 mole, and $1 \times 10^{-7}$ to $1 \times 10^{-1}$ mole per mole of silver halide, which may be incorporated to a photothermographic material at any time of from silver halide grain formation and to coating.

The quaternary onium compound and the amino compound may be used alone or in combination. These compounds may be incorporated into any component layer of the photothermographic material, preferably a component layer provided on the photosensitive layer-side, and more preferably a photosensitive layer and/or its adjacent layer.

Binders suitable for the photothermographic material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly(vinylpyrrolidone), casein, starch, poly(acrylic acid), poly(methylmethacrylic acid), poly(vinyl chloride), poly(methacrylic acid), copoly(styrene-maleic acid anhydride), copoly(styrene-acrylonitrile), copoly(styrene-butadiene), polyvinyl acetal) series (for example, poly(vinyl formal)and poly(vinyl butyral), poly(ester) series, poly(urethane) series, phenoxy resins, poly(vinylidene chloride), poly(epoxide) series, poly(carbonate) series, polyvinyl acetate) series, cellulose esters, poly(amide) series. These may be hydrophilic or hydrophobic polymers. Hydrophobic transparent binders are preferably employed to reduce fogging after thermal development. Examples of preferred binders include polyvinyl butyral, cellulose acetate, cellulose acetatebutylate, polyester, polycarbonate, polyacrylic acid and polyurethane. Of these, polyvinyl butyral, cellulose acetate and cellulose acetatebutylate are more preferred. The hydrophobic binder and hydrophilic binder may be used in combination. The amount of a binder in a photosensitive layer is preferably 1.5 to 6 g/m$^2$, and more preferably 1.7 to 5 g/m$^2$ to promote thermal development. The amount of less than 1.5 g/m2 results in an increase density of an unexposed area to levels unacceptable to practical use.

Matting Agent

In the present invention, a matting agent is preferably incorporated into the image forming layer side. In order to minimize the image abrasion after thermal development, the matting agent is provided on the surface of a photosensitive material and the matting agent is preferably incorporated in an amount of 0.5 to 30 percent in weight ratio with respect to the total binder in the emulsion layer side. In cases where a light-insensitive layer is provided on the opposite side of the support to the light-sensitive layer, it is preferred to incorporate a matting agent into at least one of the light-insensitive layer (and more preferably, into the surface layer) in an amount of 0.5 to 40% by weight, based on the total binder on the opposite side to the photosensitive layer. The shape of the matting agent may be crystalline or amorphous. However, a crystalline and spherical shape is preferably employed.

Protective Layer

There may be provided a non-photosensitive layer outside the photosensitive layer to protect the surface of a photothermographic material or preven abrasion marks. Bonders used in the non-photosensitive layer may be the same as or different from those used in the photosensitive layer. Binders exhibiting higher softening temperature than those in the photosensitive layer are employed to prevent abrasion marks and deformation of phases, including triacetyl cellulose or cellulose acetatebutylate.

Other Layer

In the photothermographic material used in this invention, there may be provided, on a support, an image forming layer alone, but at least a non-image forming layer is preferably provided on the image forming layer. To control the amount or wavelength distribution of light passing through the image forming layer, there may be a filter dye layer on the image forming layer-side or an anti-halation dye layer, so-called backing layer on the opposite side. A dye or pigment may be incorporated to the image forming layer. The non-image forming layer may contain the binder or matting agent described above, or lubricants such as a polysiloxane compound or liquid paraffin.

Various types of surfactants can be employed as a coating aid in the photothermographic material used in this invention. Specifically, fluorinated surfactants are preferably employed to improve an antistatic property or to prevent dot-like coating troubles.

The photosensitive layer may be comprised of plural layers, which may be arranged in the form such as high-speed layer/low-speed layer or low-speed layer/high-speed layer to adjust contrast.

Tone Modifier

Suitable image tone modifiers are exemplarily described in RD17029.

Restrainer

Mercapto compounds, disulfide compounds and thione compounds may be incorporated the photothermographic materials for the purpose of retarding or accelerating development, enhancing spectral sensitization efficiency or improving storage stability of unprocessed or processed photothermographic materials.

Antifoggant

There may be incorporated anti-foggant to the photothermographic materials. Various addenda may be incorporated to any one of a photosensitive layer, a light-insensitive layer and other component layers. For example, various surfactants, antioxidants, stabilizer, plasticizer, UV absorbent, or coating aid may be used. As these addenda and other adjuvants described above, compounds described in RD17029 (June 1978, page 9–15) are preferably employed.

EXAMPLES

The present invention will be further described based on examples but the invention is not limited to these.

Evaluation methods described in Examples are as follows.

Glass Transition Temperature

Ten mg a film was set into a differential scanning type calorimeter (DSG220, available from SEIKO DENSHI Co., Ltd., in which the temperature was raised at a rate of 20° C./min in a stream of nitrogen gas to detect the glass transition point (Tg). The Tg is an average value between the temperature deviating from the base line and the temperature returning to the base line.

Rise Curl

Film of 30 mm in width and 200 mm in length which was previously subjected to thermal treatment was aged under the condition of 23° C. and 55% RH for a period of 1 day. Thereafter, the thus aged film was wound around a core of 3 inches in diameter and fixed to prevent releasing.

Subsequently, the film was put into an aluminum barrier bag, then, thermally treated under the condition of 55° C. and 20% RH for 4 hrs. and after which it was allowed to stand under the condition of 23° C. and 55% RH for 15 min. Thereafter, the film was unwound from the core. When the convex side of the film was placed downward, the rising height (mm) of the four corners of the film were measured and an average value thereof was represented as the rise curl.

tan δ

Thermal stress-strain measurement was made in a thermomechanical analysis apparatus, TMA/SS6100 (available from SEIKO Instrument Co., Ltd.). The thus obtained thermal stress-strain data was converted to dynamic viscoelasticity data using viscoelasticity conversion software TMA Rheo (available from the same company). Thus, a film support and a photothermographic material film each were cut to a size of 4 mm in width and 20 mm in length and subjected to thermal stress-strain measurement at a load of 50±25 g and a measuring frequency of 0.01 Hz, using a quartz tensile probe, while the temperature was raised from room temperature to 200° C. at a rate of 2° C./min. The measured thermal stress-strain data was converted through the software and from the obtained tan δ chart, a downwardly prudent peak value (or a valley value, i.e., a minimum value) within the range of 100 to 160° C. was determined from the obtained tan δ chart. In cases where the tan δ simply decreased within this temperature range, it was regarded as no minimum value.

Thermal Shrinkage of Support

A central portion along the width direction of a film support which was previously subjected to a thermal treatment was cut to a size of 150 mm (longitudinal direction) and 150 mm (width direction) and after being aged under the condition of 23° C. and 55% RH for 1 day, marking lines were scratched into the surface at 100 mm intervals. Further, the film support was heat-treated by pressing it closely to a hot plate heated to 120° C. (EC-1200, available from IUCHI SEIEIDI Co., Ltd.) for 30 sec. and after being aged under the condition of 23° C. and 55% RH for 1 day, the spacing between the marking lines was measured. Then, the difference in spacing between before and after heat-treating was calculated and a ratio of the difference to the spacing before heat-treating was represented by a percentage. Measurements were conducted on five sheets of the film support and an average value thereof was calculated.

Abrasion

Photothermographic material samples each were cut to a size of 590×590 mm and thermally processed in an automatic thermal processor produced by Konica Corp. Immediately after processing, the photosensitive layer side was subjected to a hardness test according to JIS Pencil Hardness Test (K5400). Evaluation was represented by hardness of a common pencil lead.

Flatness Recovery

Photothermographic material samples each were cut to a size of 590×590 mm and thermally processed in an automatic thermal processor produced by Konica Corp. Immediately after processing, samples were allowed to overlap and after fitting both ends and securing them with clips, samples were held for 1 min. so that the convex side was placed downward. Thereafter, the clips were released and each sample was placed on a flat table and evaluated with respect to flatness, based on the following criteria:

A: being totally flat;

B: no concave or convex surface but a slight rise at the four corners;

C: deficient concave or convex surface being observed.

Preparation of Photographic Support

A PET resin was obtained as follows.

PET Resin

To 100 parts by weight of dimethyl terephthalate and 65 parts by weight of ethylene glycol was added 0.05 parts by weight of magnesium acetate as a transesterification catalyst and easter interchange was carried out according to the conventional method. To the obtained product were added 0.05 parts by weight of antimony trioxide and 0.03 parts by weight of trimethyl phosphate. Subsequently, the mixture was gradually heated with evacuating, and polymerization was carried out at 280° C. and 0.5 mmHg to obtain polyethylene terephthalate (PET) resin exhibiting 0.65 of an intisic viscosity.

Using the thus obtained PET resin, a biaxially stretched PET film was prepared according to the following procedure.

Biaxially Stretched PET Film

PET resin pellets are dried under reduced pressure at 150° C. for 8 hrs., then melted at 300° C., extruded through a T-type die, closely brought into contact with a cooling drum maintained at 30° C. with applying static electricity, and cooled to prepare non-stretched film. Using a roll type longitudinally stretching machine, the film was longitudinally stretched by 3.3 time at a temperature of 110° C. Then, using a tenter type laterally stretching machine, the thus obtained uniaxially stretched film was laterally stretched to 50% of the total lateral stretch magnification in the first stretching zone at 90° C. and was further laterally stretched by 3.3 times in the second zone at 100° C. The stretched film was thermally treated at 70° C. for 2 sec., then thermally fixed at 150° C. for 5 sec in the first fixing zone and further thermally relaxed at 220° C. for 15 sec. The film was further subjected to thermal relaxation by 5% in the lateral direction at 160° C. After coming out from the tenter, the film was subjected to thermal relaxation in the longitudinal direction at 140° C., employing the difference in circumferential speed between driving rolls and cooled to room temperature in 60 sec. The film was released from a clip and wound up to obtain 125 μm thick, biaxially stretched PET film. The Tg the PET film were 79° C.

Preparation of Subbed Support

Both surfaces of each of the obtained PET film was subjected to corona discharging at 8 w/m².min. Onto the surface of one side, the subbing coating composition a-1 described below was applied so as to form a dried layer thickness of 0.8 μm, which was then dried. The resulting coating was designated Subbing Layer A-1. Onto the opposite surface, the subbing coating composition b-1 described below was applied to form a dried layer thickness of 0.8 μm. The resulting coating was designated Subbing Layer B-1.

Subbing Coating Composition a-1

| | |
|---|---|
| Latex solution (solid 30%) of a copolymer consisting of n-butyl acrylate (40 weight %), styrene (20 weight %) and glycidyl methacrylate (40 weight %) | 40 g |
| Latex solution (solid 30%) of a copolymer consisting of n-butyl acrylate (2 weight %), styrene (59 weight %) and glycidyl methacrylate (39 weight %) | 150 g |
| Silica particles (av. size of 3 μm) (C-6) | 0.6 g |
| Water to make | 1 liter |

Subbing Coating Composition b-1

| | |
|---|---|
| $SnO_2$/Sb (9/1 by weight, av. Size 0.18 μm) | 200 mg/m² |
| Latex liquid (solid 30%) | 270 g |
| of a copolymer consisting of | |
| n-butyl acrylate (30 weight %) | |
| styrene (20 weight %) | |
| glycidyl acrylate (40 weight %) | |
| (C-6) | 0.6 g |
| Water to make | 1 liter |

Subsequently, the surface of Subbing Layer B-1 were subjected to corona discharging with 8 w/m².minute. Onto the Subbing Layer B-1, the upper subbing layer coating composition b-2 was applied so at to form a dried layer thickness of 0.4 μm, which was designated Subbing Upper Layer B-2.

Subbing Coating Composition

| | |
|---|---|
| Latex solution (solid 30%) of a copolymer consisting of n-butyl acrylate (10 weight %), t-butyl acrylate (35 weight %) styrene (25 weight %) and hydroxy ethyl acrylate (30 weight %) | 140 g |
| Silica particles (av. size 3 μm) | 0.6 g |
| Water to make | 1 liter |
| (C-6) | |

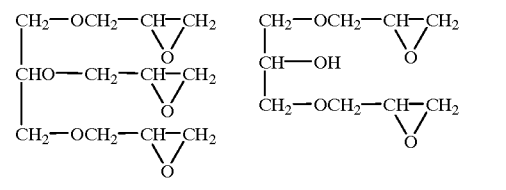

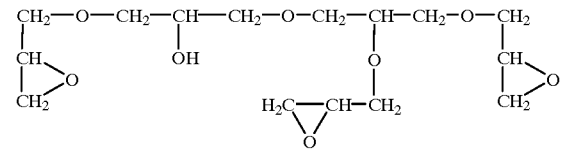

Mixture consisting of the three compounds illustrated above

Thermal Treatment of Support

The subbed support was subjected to the thermal treatment in the thermal treatment zone (a total length of 200 m) at a temperature and a transport speed under tension, as shown in Table 1. The thermally treated support was cooled at a rate of 10° C./min and then was wound up. Rise curl, tan δ (minimum value), and thermal shrinkage at 120° C. for 30 sec. of each support sample are shown in Table 1. Further, variation of tan δ with temperature are shown in FIG. 1.

TABLE 1

| | | Thermal Treatment Condition | | | | | | | | Thermal Shrinkage 120° C., 30 sec. | |
|---|---|---|---|---|---|---|---|---|---|---|---|
| | | Temperature (° C.) | | | | Treatment | Transport | Rise | Minimum | | |
| Sample No. | Support | Zone 1 (Inlet) | Zone 2 | Zone 3 | Zone 4 (Outlet) | Time (min) | Tension (kg/cm$^2$) | Curl (mm) | of tan δ[*3] | MD[*1] (%) | TD[*2] (%) |
| 1 (Comp.) | 1 | 95 | 95 | 95 | 95 | 16 | 35 | 33.5 | no minimum | 0.09 | 0.03 |
| 2 (Comp.) | 2 | 120 | 120 | 120 | 120 | 2 | 35 | 29.6 | no minimum | 0.06 | 0.02 |
| 3 (Comp.) | 3 | 135 | 135 | 135 | 135 | 16 | 12 | 28.5 | 0.19 | 0.08 | 0.03 |
| 4 (Inv.) | 4 | 135 | 135 | 135 | 135 | 16 | 4 | 19.8 | 0.15 | 0.03 | 0.02 |
| 5 (Inv.) | 5 | 155 | 135 | 120 | 95 | 2 | 4 | 17.8 | 0.12 | 0.05 | 0.02 |
| 6 (Inv.) | 6 | 155 | 135 | 120 | 95 | 8 | 4 | 13.5 | 0.11 | 0.03 | 0.02 |
| 7 (Inv.) | 7 | 155 | 135 | 120 | 95 | 16 | 4 | 7.7 | 0.11 | 0.03 | 0.02 |
| 8 (Inv.) | 8 | 180 | 155 | 135 | 120 | 2 | 4 | 9.8 | 0.10 | 0.02 | 0.01 |

[*1]MD: Machine direction (or longitudinal direction)
[*2]TD: Traverse direction (or lateral direction)
[*3]Measured at 120–140° C.

In the Table, minimum tan δ values of support sample 3 to 8 were found within the range of 120 to 140° C. As can be seen from Table 1, when subjected to thermal treatment within the preferred range, reduced roll-set curl was achieved and it was further proved that when the tan δ value was within the range of the invention, superior thermal dimensional stability was achieved.

Preparation of Photothermographic Material
Preparation of Silver Halide Emulsion A In 900 ml of deionized water were dissolved 7.5 g of gelatin and 10 mg of potassium bromide. After adjusting the temperature and the pH to 35° C. and 3.0, respectively, 370 ml of an aqueous solution containing 74 g silver nitrate and an equimolar aqueous solution containing sodium chloride, potassium bromide, potassium iodide (in a molar ratio of 60/38/2), and $1\times10^{-6}$ mol/mol Ag of [Ir(NO)Cl$_5$] and $1\times10^{-6}$ mol/mol Ag of rhodium chloride were added by the controlled double-jet method, while the pAg was maintained at 7.7. Thereafter, 4-hydroxy-6-methyl-1,3,3a,7-tetraazaindene was added and the pH was adjusted to 5 using NaOH. There was obtained cubic silver iodobromochloride grains having an average grain size of 0.06 μm, a variation coefficient of the projection area equivalent diameter of 10 percent, and the proportion of the {100} face of 87 percent. The resulting emulsion was flocculated to remove soluble salts, employing a flocculating agent. Then, 0.1 g of phenoxyethanol was added thereto and the pH and pAg were adjusted to 5.9 and 7.5, respectively to obtain silver halide emulsion A.

Preparation of Sodium Behenate Solution

In 945 ml water were dissolved 32.4 g of behenic acid, 9.9 g of arachidic acid and 5.6 g of stearic acid at 90° C. Then, after adding 98 ml of 1.5M aqueous sodium hydroxide solution with stirring and further adding 0.93 ml of concentrated nitric acid, the solution was cooled to a temperature of 55° C. for 30 min. to obtain an aqueous sodium behenate solution.

Preparation of Pre-formed Emulsion of Silver Behenate and Silver Halide Emulsion A To the aqueous sodium behenate solution described above was added 15.1 g of silver halide emulsion A. After adjusting the pH to 8.1 with aqueous sodium hydroxide, 147 ml of aqueous 1M silver nitrate solution was added thereto in 7 min and after stirring for 20 min., soluble salts were removed by ultrafiltration. Thus obtained silver behenate was comprised of monodisperse particles having an average particle size of 0.8 μm and a monodisperse degree (i.e., variation coefficient of particle size) of 8%. After forming flock of the dispersion, water was removed therefrom and after washing and removal of water were repeated six times, drying was conducted.

Preparation of Photosensitive Emulsion

To a half of the thus prepared pre-formed emulsion were gradually added 544 g of methyl ethyl ketone solution of 17 wt % polyvinyl butyral (average molecular weight of 3,000) and 107 g of toluene. Further, the mixture was dispersed by a media dispersing machine using 0.5 mm ZrO$_2$ beads mill and at 4,000 psi and 30° C. for 10 min.

On both sides of each of the subbed and thermally treated supports, 1, 5, 7 and 8 shown in Table 1, the following layers were simultaneously coated and dried at 80° C. for 10 min to prepare photothermographic material samples 21 to 24. Each sample was in a 590 mm wide roll form and packaged for use in roomlight loading.

Back Coating

On the B-1 layer of the support, the following composition was coated.

| | |
|---|---|
| Cellulose acetate-butylate (10% methyl ethyl ketone solution) | 15 ml/m$^2$ |
| Dye-A | 7 mg/m$^2$ |
| Dye-B | 7 mg/m$^2$ |
| Matting agent: monodisperse silica having a monodisperse degree of 15% and average size of 8 μm | 90 mg/m$^2$ |
| Fluorinated surfactant C$_8$F$_{17}$(CH$_2$CH$_2$O)$_{12}$C$_8$H$_{17}$ | 50 mg/m$^2$ |
| Fluorinated surfactant C$_9$F$_{19}$—C$_6$H$_4$—SO$_3$Na | 10 mg/m$^2$ |

Dye-A

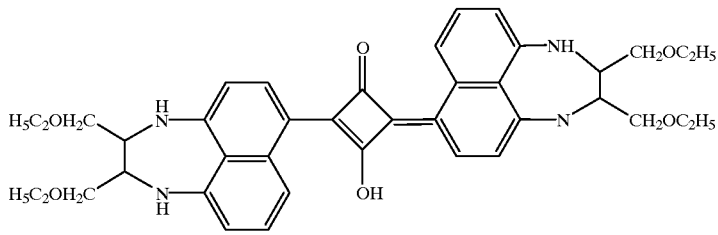

Dye-B

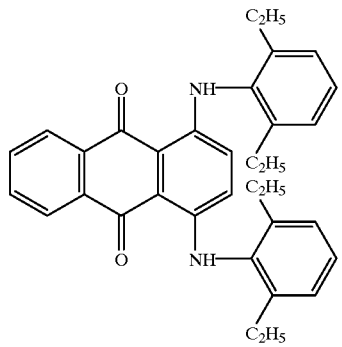

Photosensitive Layer 1

On the sub-layer A-1 side of the support, a photosensitive layer having the following composition was coated so as to have silver coverage of 2.1 g/m$^2$.

Photosensitive Layer Coating Solution

| | |
|---|---|
| Photosensitive emulsion | 240 g |
| Sensitizing dye (0.1% methanol solution) | 1.7 ml |
| Pyridinium bromide perbromide | 3 ml |
| (6% methanol solution) | |
| Calcium bromide (0.1% methanol solution) | 1.7 ml |
| Oxidizing agent (10% methanol solution) | 1.2 ml |
| 2-(4-Chlorobenzoyl)-benzoic acid | 9.2 ml |
| (12% methanol solution) | |
| 2-Mercaptobenzimidazole | 11 ml |
| (1% methanol solution) | |
| Tribromethylsulfoquinoline | 17 ml |
| (5% methanol solution) | |
| Hydrazine derivative H-26 | 0.4 g |
| Nucleation promoting agent P-51 | 0.3 g |
| Phthalazinone | 0.6 g |
| 4-Methylphthalic acid | 0.25 g |
| Tetrachlorophthalic acid | 0.2 g |
| Calcium carbonate (av. Size of 3 μm) | 0.1 g |
| 1,1-bis(2-hydroxy-3,5-dimethylphenyl)- | |
| methylpropane (20% methanol solution) | 20.5 ml |
| Isocyanate compound (Desmodur N3300, | |
| Available from Movey Corp.) | 0.5 g |
| Sensitizing dye | |

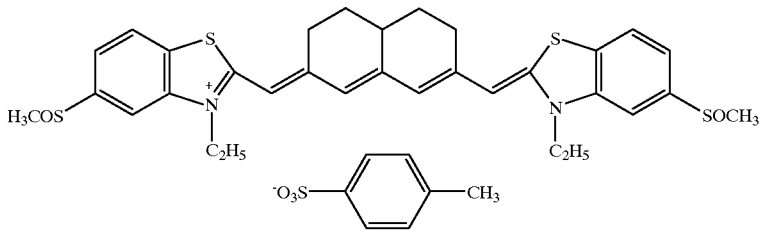

-continued

Oxidizing agent

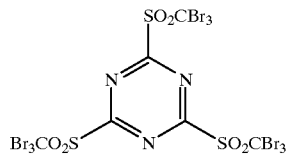

Surface Protective Layer

The following composition was coated on the photosensitive layer simultaneously therewith.

| | |
|---|---|
| Acetone | 5 ml/m² |
| Methyl ethyl ketone | 21 ml/m² |
| Cellulose acetate | 2.3 g/m² |
| Methanol | 7 ml/m² |
| Phthalazinone | 250 mg/m² |
| Matting agent, monodisperse silica having monodispersity of 10% and a mean size of 4 μm | 5 mg/m² |
| $CH_2$=$CHSO_2CH_2CH_2OCH_2CH_2SO_2CH$=$CH_2$ | 35 mg/m² |
| Fluorinated surfactant $C_{12}F_{25}(CH_2CH_2O)_{10}C_{12}F_{25}$ | 10 mg/m² |
| Surfactant $C_8H_{17}$—$C_6H_4$—$SO_3Na$ | 10 mg/m² |

The thus obtained photothermographic material samples 21 14 were evaluated with respect to thermal shrinkage, abrasion and flatness recovery.

TABLE 2

| Sample No. | Support | Minimum tan δ | Temperature Difference* (° C.) | Thermal Shrinkage 120° C., 30 sec. | | Abrasion | Flatness Recovery |
|---|---|---|---|---|---|---|---|
| | | | | MD (%) | TD (%) | | |
| 21 (Comp.) | 1 | no minimum | 55 | 0.07 | 0.03 | 6B | C |
| 22 (Inv.) | 5 | 0.12 | 55 | 0.02 | 0.03 | 2B | A |
| 23 (Inv.) | 7 | 0.11 | 55 | 0.02 | 0.01 | 2B | A |
| 24 (Inv.) | 8 | 0.10 | 55 | 0.02 | 0.01 | 2B | A |

*Temperature difference of surface temperature of a photographic material between inlet and outlet in the cooling section As can be seen from Tables 1 and 2, it was proved that photothermographic materials obtained using the support exhibiting the tan δ value within the range of the invention resulted in superior thermal dimensional stability and improvements in abrasion and flatness recovery.

What is claimed is:

1. A polyester film exhibiting a minimum value of not more than 0.15 with respect to tan δ obtained at a frequency of 0.01 Hz within the range of 100 to 160° C., the tan δ being determined in a tensile viscoelasticity measurement.

2. The polyester film of claim 1, wherein the polyester film comprises polyethylene terephthalate or polyethylene naphthalate.

3. The polyester film of claim 2, wherein the polyester film is a biaxially stretched film.

4. The polyester film of claim 2, wherein the polyester film exhibits a minimum value of not more than 0.15 with respect to tan δ obtained at a frequency of 0.01 Hz within the range of 120 to 140° C.

5. The polyester film of claim 4, wherein the polyester film comprises polyethylene terephthalate.

6. The polyester film of claim 5, wherein the polyethylene terephthalate exhibits an intrinsic viscosity of 0.3 to 1.0.

7. The polyester film of claim 1, wherein the polyester film exhibits a rise curl of not more than 20 mm when the polyester film is wound around a core of a diameter of 3 inches and allowed to stand at 55° C. and 20% RH for a period of 4 hrs.

8. A photographic support comprising a polyester film, wherein the polyester exhibits a minimum value of not more than 0.15 with respect to tan δ obtained at a frequency of 0.01 Hz within the range of 100 to 160° C., the tan δ being determined in a tensile viscoelasticity measurement.

9. The support of claim 8, wherein the polyester film comprises polyethylene terephthalate or polyethylene naphthalate.

10. The support of claim 9, wherein the polyester film is a biaxially stretched film.

11. The support of claim 9, wherein the polyester film exhibits a minimum value of not more than 0.15 with respect to tan δ obtained at a frequency of 0.01 Hz within the range of 120 to 140° C.

12. The support of claim 10, wherein the polyester film comprises polyethylene terephthalate.

13. The support of claim 11, wherein the polyethylene terephthalate exhibits an intrinsic viscosity of 0.3 to 1.0.

14. The support of claim 8, wherein the polyester film exhibits a rise curl of not more than 20 mm when the polyester film is wound around a core of a diameter of 3 inches and allowed to stand at 55° C. and 20% RH for a period of 4 hrs.

15. The support of claim 10, wherein the biaxially stretched polyester film, after thermal fixing, is subjected to a thermal treatment at a temperature between a glass transition point of the film and the glass transition temperature plus 100° C. for a period of 0.5 to 60 min, while being transported under a tension of 0.01 to 30 kg/cm².

16. The support of claim 15, wherein the polyester film is subjected to a thermal treatment, while passing through a thermal treatment zone under a tension, the thermal treatment temperature gradually decreasing and the tension gradually increasing from an inlet of the thermal treatment zone toward the outlet of the thermal treatment zone.

17. A photothermographic material comprising a support having thereon an organic silver salt, a silver halide and a reducing agent, where the support comprises a polyester film exhibiting a minimum value of not more than 0.15 with respect to tan δ obtained at a frequency of 0.01 Hz within the range of 100 to 160° C., the tan δ being determined in a tensile viscoelasticity measurement.

18. The photothermographic material of claim 17, wherein the polyester film comprises polyethylene terephthalate or polyethylene naphthalate.

19. The photothermographic material of claim 18, wherein the polyester film is a biaxially stretched polyester film.

20. The photothermographic material of claim 17, wherein the polyester film exhibits a minimum value of not more than 0.15 with respect to tan δ obtained at a frequency of 0.01 Hz within the range of 120 to 140° C.

21. The photothermographic material of claim 20, wherein the polyester film comprises polyethylene terephthalate.

22. The photothermographic material of claim 21, wherein the polyethylene terephthalate exhibits an intrinsic viscosity of 0.3 to 1.0.

23. The photothermographic material of claim 17, wherein the polyester film exhibits a rise curl of not more than 20 mm when the polyester film is wound around a core of a diameter of 3 inches and allowed to stand at 55° C. and 20% RH for a period of 4 hrs.

24. The photothermographic material of claim 20, wherein the organic silver salt is a silver salt of a long chain fatty acid, the long chain having 10 to 30 carbon atoms.

* * * * *